United States Patent
Linde et al.

(10) Patent No.: US 6,744,807 B1
(45) Date of Patent: Jun. 1, 2004

(54) MULTI-DIMENSIONAL SPREAD SPECTRUM MODEM

(75) Inventors: Louis Philippus Linde, Gauteng (ZA); Frans Engelbertius Marx, Gauteng (ZA)

(73) Assignee: University of Pretoria, Pretoria (ZA)

( * ) Notice: Subject to any disclaimer, the term of this patent is extended or adjusted under 35 U.S.C. 154(b) by 577 days.

(21) Appl. No.: 09/583,707

(22) Filed: May 31, 2000

(51) Int. Cl.$^7$ ............................................... H04B 1/707

(52) U.S. Cl. .................. 375/140; 375/144; 375/146; 375/147

(58) Field of Search .................. 375/130, 140, 375/144, 146, 147, 148

(56) References Cited

U.S. PATENT DOCUMENTS

| | | | |
|---|---|---|---|
| 5,235,615 A | 8/1993 | Omura | 375/1 |
| 5,353,303 A | 10/1994 | Walthall | 375/1 |
| 5,555,268 A | 9/1996 | Fattouche et al. | 375/206 |
| 5,559,828 A | 9/1996 | Armstrong et al. | 375/200 |
| 5,596,601 A | 1/1997 | Bar-David | 275/207 |
| 5,610,940 A | 3/1997 | Durrant et al. | 375/208 |
| 5,623,485 A | 4/1997 | Bi | 370/209 |
| 5,629,956 A | 5/1997 | Durrant et al. | 375/208 |
| 5,668,795 A | 9/1997 | Magill et al. | 370/209 |
| 5,715,236 A | 2/1998 | Gilhousen et al. | 370/209 |
| 5,856,998 A | 1/1999 | Durrant et al. | 375/208 |
| 5,943,361 A | 8/1999 | Gilhousen et al. | 375/200 |

FOREIGN PATENT DOCUMENTS

JP 4-328921 * 11/1992

OTHER PUBLICATIONS

F.E. Marx etal., Theoretical Analysis and Practical Implementation of a Balanced DSS Transmitter and Receiver Employing Complex Spreading Sequences IEEE, pp 402–(1998).

F.E. Marx et al., A Combined Coherent Carrier Recovery and Decision–Directed Delay–Lock–Loop Scheme for DS/SSMA Communication Systems Employing Complex Spreading Sequences IEEE, pp 131–139 (1998).

J.E. Cillers et al., :A Synchronous $Q^2$PSK DS–CDMA System; System Conceptualisation, Implementation and Performance Analysis IEEE, pp 4–8 (1998).

* cited by examiner

*Primary Examiner*—Temesghen Ghebretinsae
(74) *Attorney, Agent, or Firm*—Jones Day

(57) ABSTRACT

An n-dimensional direct sequence spread spectrum modulator (10) comprises a spreading sequence generator (21) for generating a set of n/2 substantially mutually orthogonal spreading sequences. The spreading sequences each comprises combinations of the real and imaginary parts of complex sequences. A first frequency spreading arrangement (24,26) comprises a first input (24.1,26.1) for a first set of n/2 parallel input data streams ($d_1(t)$ $d_2(t)$), a second input (24.2, 26.2) for the set of spreading sequences and an output (24.3, 26.3). Respective input data streams are associated with respective spreading sequences in the set of spreading sequences. A second frequency spreading arrangement (28, 30) comprises a first input (28.1, 30.1) for a second set of n/2 parallel input data streams ($d_3(t)$, $d_4(t)$), a second input (28.2, 30.2) for the set of spreading sequences and an output (28.3, 30.3). Respective input data streams being associated with respective spreading sequences in the set of spreading sequences. A quadrature modulator (42) comprises a first input (36.1) and a second input (38.1) and an output (40). The first input (36.1) is connected to the output of the first frequency spreading arrangement and the second input (38.1) is connected to the output of the second frequency spreading arrangement. An associated demodulator is also disclosed.

28 Claims, 27 Drawing Sheets

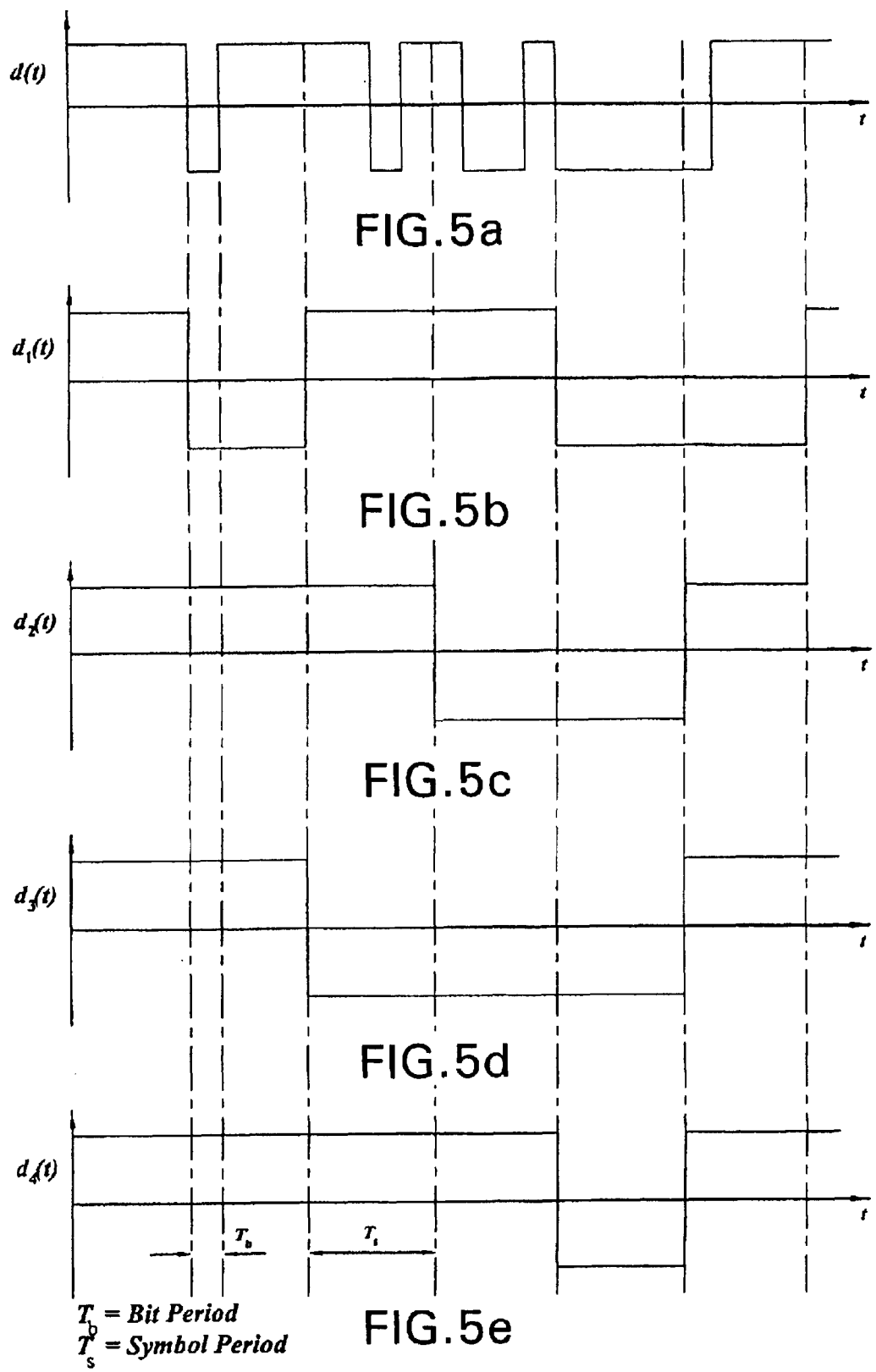

MULTI-DIMENSIONAL SPREAD SPECTRUM MODEM

INTRODUCTION AND BACKGROUND

THIS invention relates to a multi-dimensional, direct sequence spread spectrum (DSSS) communication system and method.

In a DSSS system, the spectrum spreading is accomplished before transmission through the use of a spreading sequence that is independent of the data signal. The same spreading sequence is used in the receiver (operating in synchronism with the transmitter) to despread the received signal, so that the original data may be recovered.

In some multiple-access communication systems, a number of independent users are required to share a common channel. It is known to use bipolar phase shift keying spread spectrum (BPSK-SS) or quadrature phase shift keying spread spectrum (QPSK-SS) modems in such systems. However, the data rate or bit error rate (BER) of these systems for a given bandwidth is not always satisfactory for many applications, for example multi-user applications and multimedia applications including voice, data and video data streams.

OBJECT OF THE INVENTION

Accordingly, it is an object of the present invention to provide a multi-dimensional DSSS modem, a modulator and a demodulator for such a modem and associated methods with which the applicant believes the aforementioned disadvantages may at least be alleviated.

SUMMARY OF THE INVENTION

According to the invention there is provided a multi-dimensional spread spectrum modulator comprising:

a spreading sequence generator for generating a set of substantially mutually orthogonal spreading sequences;

a first frequency spreading means comprising a first input for a first set of parallel input data streams; a second input for the set of spreading sequences, respective input data streams being associated with respective spreading sequences in the set of spreading sequences; and an output;

a second frequency spreading means comprising a first input for a second set of parallel input data streams; a second input for the set of spreading sequences, respective input data streams being associated with respective spreading sequences in the set of spreading sequences; and an output; and a quadrature modulator comprising first and second inputs and an output, the first input of the quadrature modulator being connected to the output of the first frequency spreading means and the second input of the quadrature modulator being connected to the output of the second frequency spreading means.

The set of spreading sequences may be derived from at least one complex sequence comprising a real part and an imaginary part.

Each spreading sequence in the set of spreading sequences may comprise a combination of at least two parts of at least one complex sequence. The combination is preferably an arithmetic sum of a real part and an imaginary part. For example, a first spreading sequence in the set may comprise the sum of the real part of the complex sequence and a negative of the imaginary part of the complex sequence and a second spreading sequence in the set may comprise a negative sum of said real part and said imaginary part of the complex sequence.

The first input of the first frequency spreading means may comprise n/2 branches for n/2 input data streams, the first spreading means may comprise n/2 spreading multipliers; and the set of spreading sequences may comprise n/2 spreading sequences connected to respective multipliers, to spread the n/2 data streams.

The first input of the second frequency spreading means may comprise n/2 branches for n/2 input data streams, the second frequency spreading means may comprise n/2 spreading multipliers and respective ones of the n/2 spreading sequences may be connected to the n/2 multipliers of the second frequency spreading means, to spread the n/2 data streams at the first input of the second frequency spreading means.

The n/2 branches of the first frequency spreading means and the n/2 branches of the second frequency spreading means may be connected to an output of a serial-to-parallel converter.

Output signals of the n/2 multipliers of the first frequency spreading means are preferably added by a first adder, to provide a first spreaded signal; and output signals of the n/2 multipliers of the second frequency spreading means are preferably added by a second adder, to provide a second spreaded signal.

The first and second spreaded signals may be modulated on first and second quadrature carriers respectively, to provide first and second modulated spreaded signals.

The first and second modulated spreaded signals may be added by a third adder to provide an output signal of the modulator.

In another embodiment of the invention the first set of data streams may be duplicated as the second set of data streams.

Also included within the scope of the present invention is an n-dimensional spread spectrum demodulator, the demodulator comprising:

an input for a received spread spectrum signal comprising n data signals;

the input being connected to a circuit for recovering quadrature carriers in the received signal;

a local despreading sequence generator for generating a set of n/2 mutually orthogonal despreading sequences;

the input also being connected to a tracking and synchronizing circuit for tracking spreading sequences in the received signal and synchronizing the locally generated despreading sequences with the tracked spreading sequences; and circuitry connected to the carrier recovery circuitry and the spreading sequence synchronization circuitry for extracting the n data signals from the received signal, utilizing the recovered quadrature carriers and the n/2 despreading sequences.

The despreading sequences may comprise combinations of real and imaginary parts of complex sequences.

The carrier recovery circuitry may comprise an n-dimensional decision-directed complex Costas carrier recovery loop having a first input for the received spread spectrum signal, a second input for the n/2 despreading sequences, a first output for the n data signals and a second output for the recovered quadrature carriers.

The second output may be taken from a voltage controlled oscillator in the loop and which oscillator is driven by a first error signal derived from n-dimensional decision-directed circuitry of the Costas carrier recovery loop.

The tracking and synchronizing circuit may comprise an n-dimensional decision-directed complex delay-locked-loop having a first input for the received spread spectrum signal, a second input connected to the second output of the carrier recovery circuitry for receiving the recovered carriers; a third input connected to the first output of the carrier recovery circuitry for inputting the recovered data signals; a fourth input for data relating to late and early replicas of the despreading sequences; a first output for the synchronized despreading sequences which is connected to the second input of the carrier recovery circuitry; and a second output for said data relating to late and early replicas of the despreading sequences and which second output is connected to said fourth input.

The first and second outputs are preferably taken from a voltage controlled code generator which is driven by a second error signal derived from n-dimensional decision-directed circuitry of the complex delay-locked-loop circuitry.

Yet further included within the scope of the invention is a modem comprising a modulator as hereinbefore defined and a demodulator as hereinbefore defined.

Still further included within the scope of the invention is a method of frequency spread modulating n data streams, the method comprising the steps of:
 dividing the n data streams into first and second groups;
 utilizing respective substantially mutually orthogonal spreading sequences to frequency spread each of the streams in the first group, to provide a first group of frequency spreaded signals;
 utilizing respective ones of the spreading sequences to frequency spread each of the streams in the second group, to provide a second group of frequency spreaded signals; and
 modulating the first group of frequency spreaded signals and the second group of frequency spreaded signals on first and second quadrature carriers respectively.

Still further included within the scope of the invention is a method of demodulating n substantially mutually orthogonal data streams in an incoming spread spectrum signal, the method comprising the steps of:
 utilizing one of: (a) a set of substantially mutually orthogonal signals; and (b) first and second quadrature carriers to separate the n data streams into first and second substantially mutually orthogonal groups of signals; and
 utilizing another of (a) and (b) to extract the n data streams from the first and second groups.

BRIEF DESCRIPTION OF THE ACCOMPANYING DIAGRAMS

The invention will now further be described, by way of example only, with reference to the accompanying diagrams and table wherein.

Figure 1:
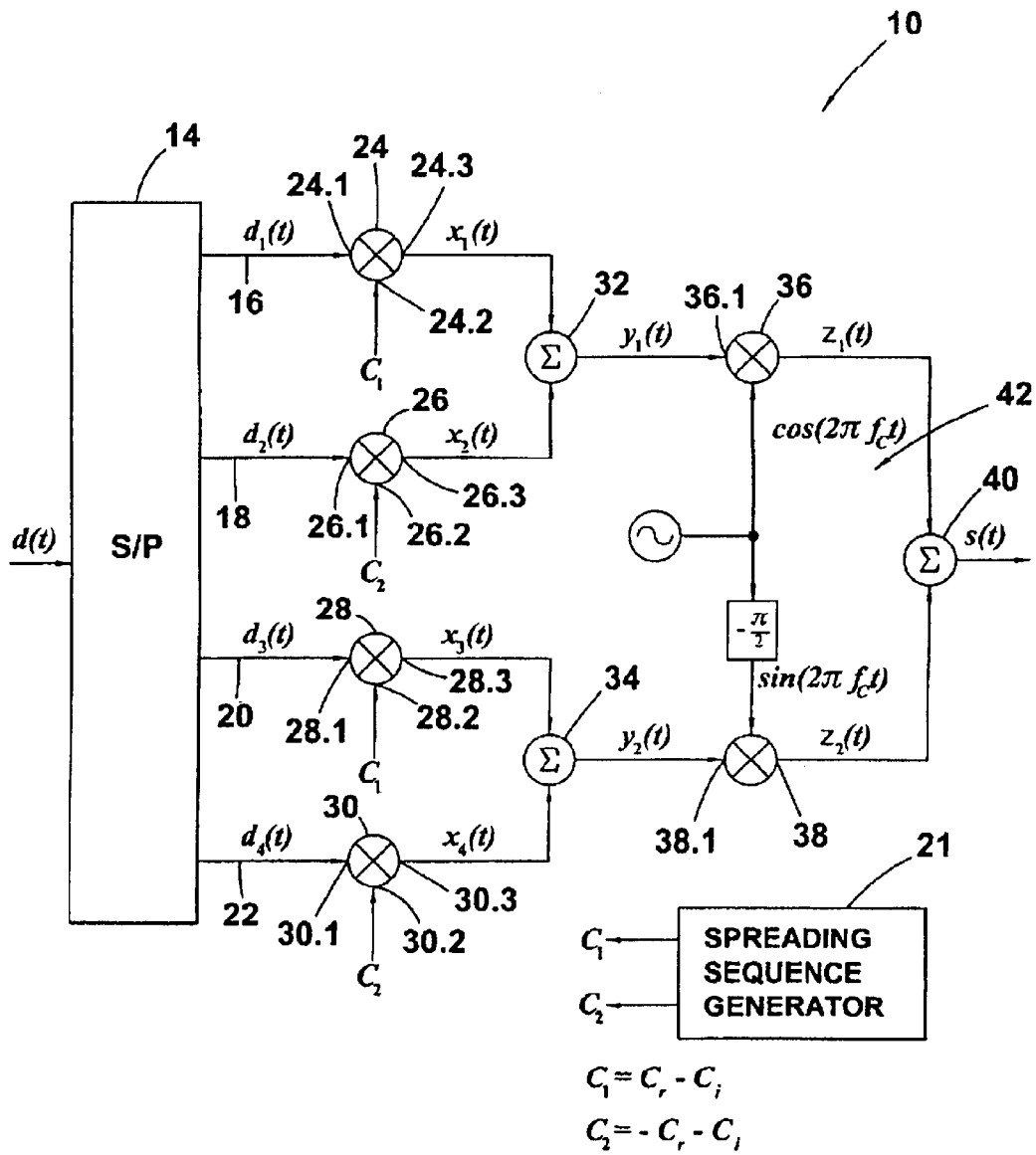
FIG. 1 is a block diagram of a four-dimensional DSSS modulator forming part of a modem according to the invention.
Figure 3:
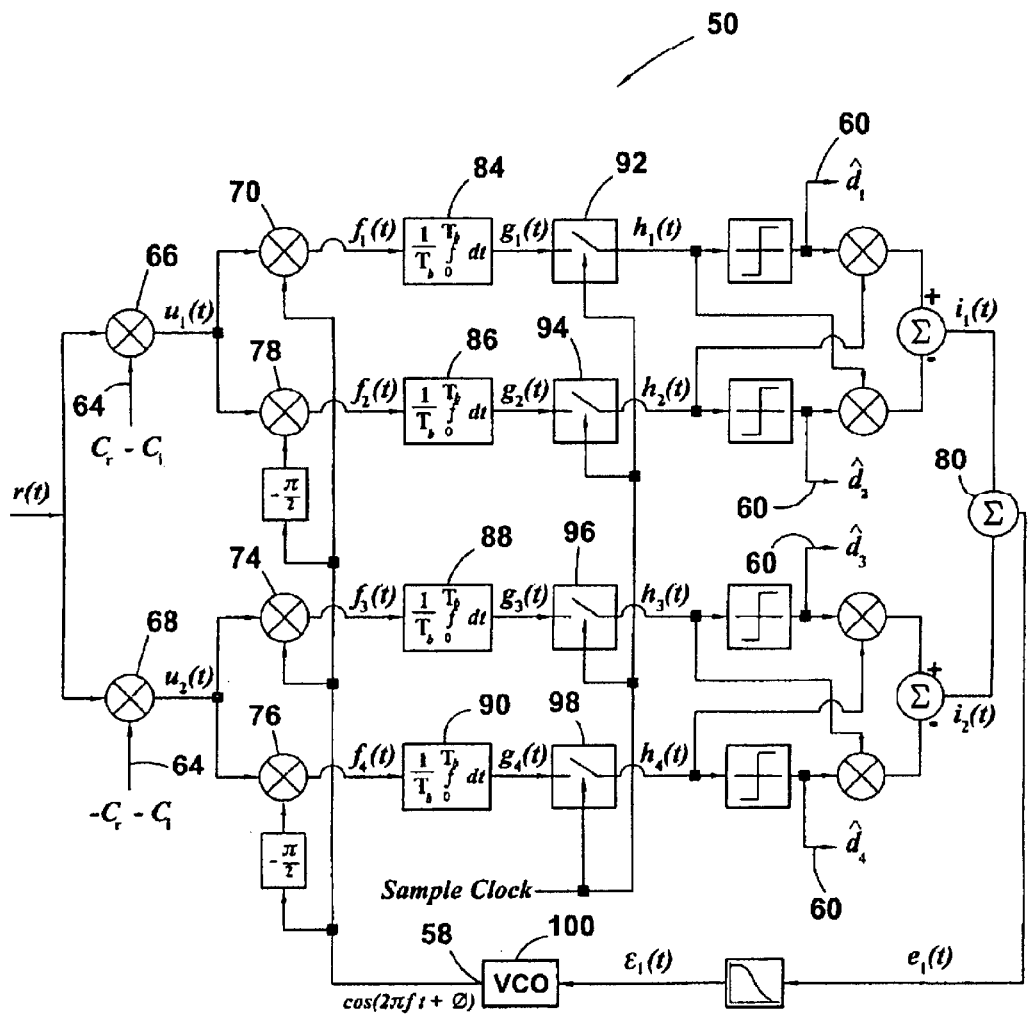
FIG. 3 is a block diagram of a four-dimensional DSSS decision-directed complex Costas carrier recovery loop (DDCCCRL) forming part of the demodulator.
Figure 11:
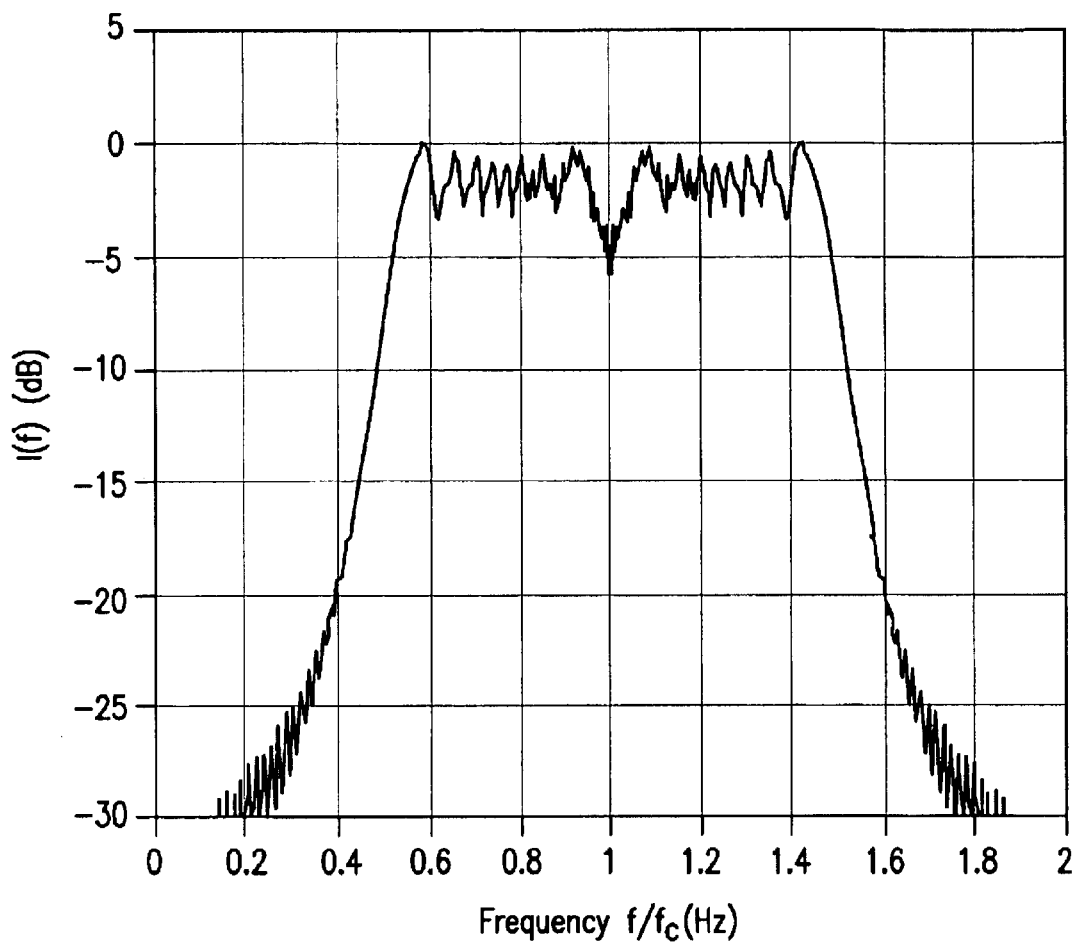
Figure 12:
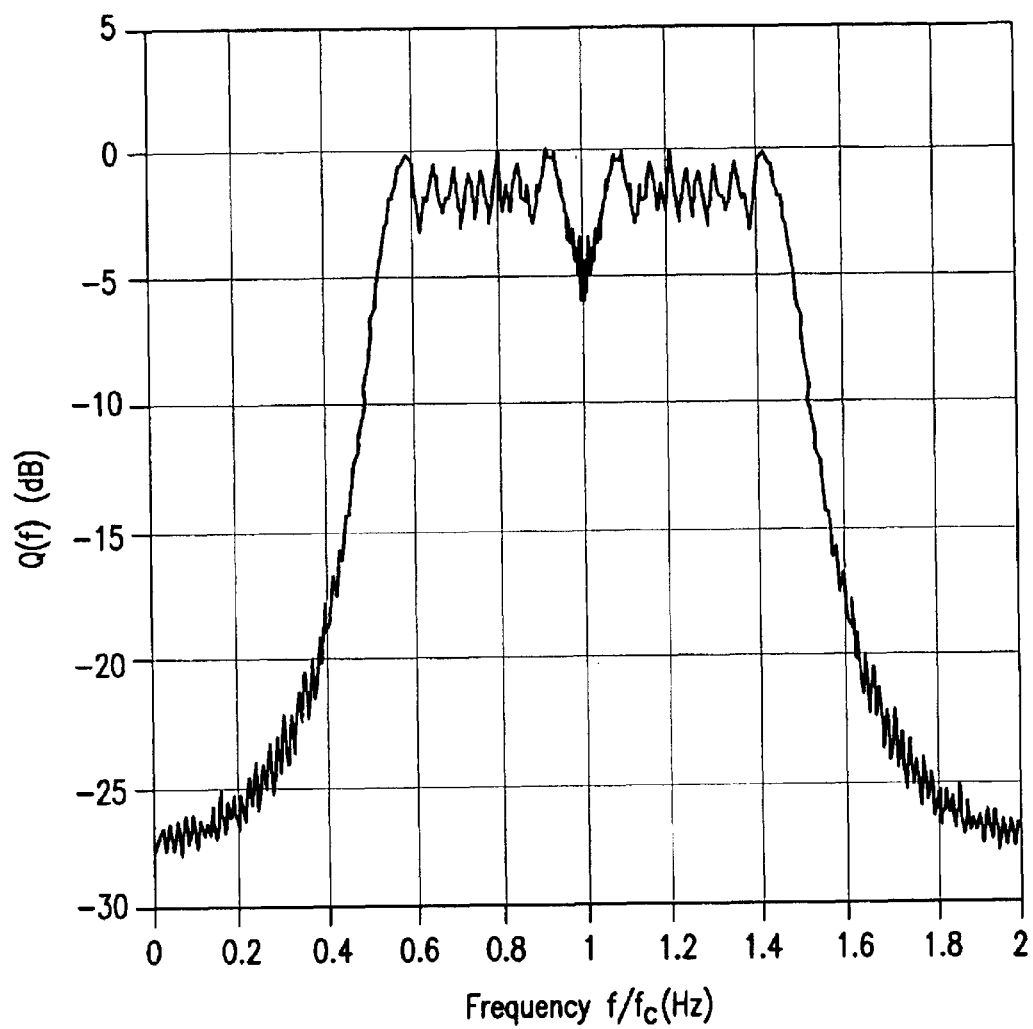
Figure 13:
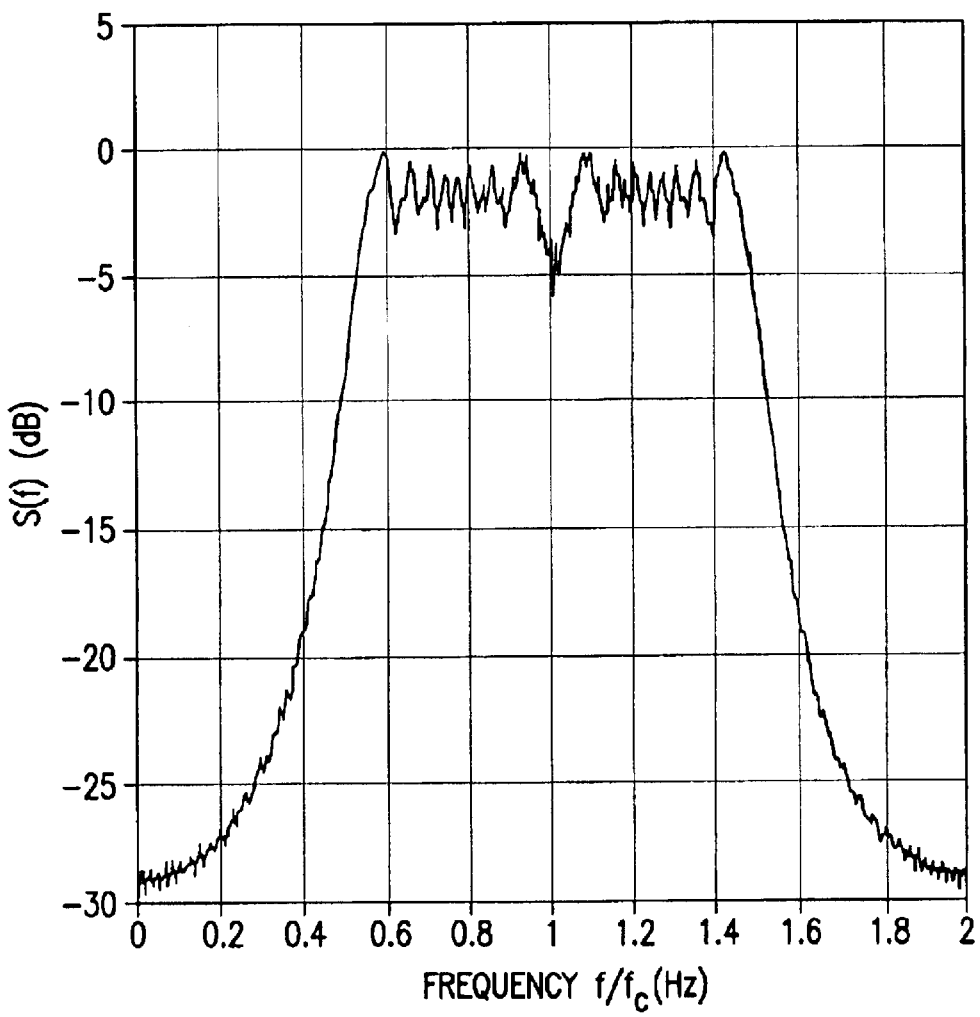
Figure 14:
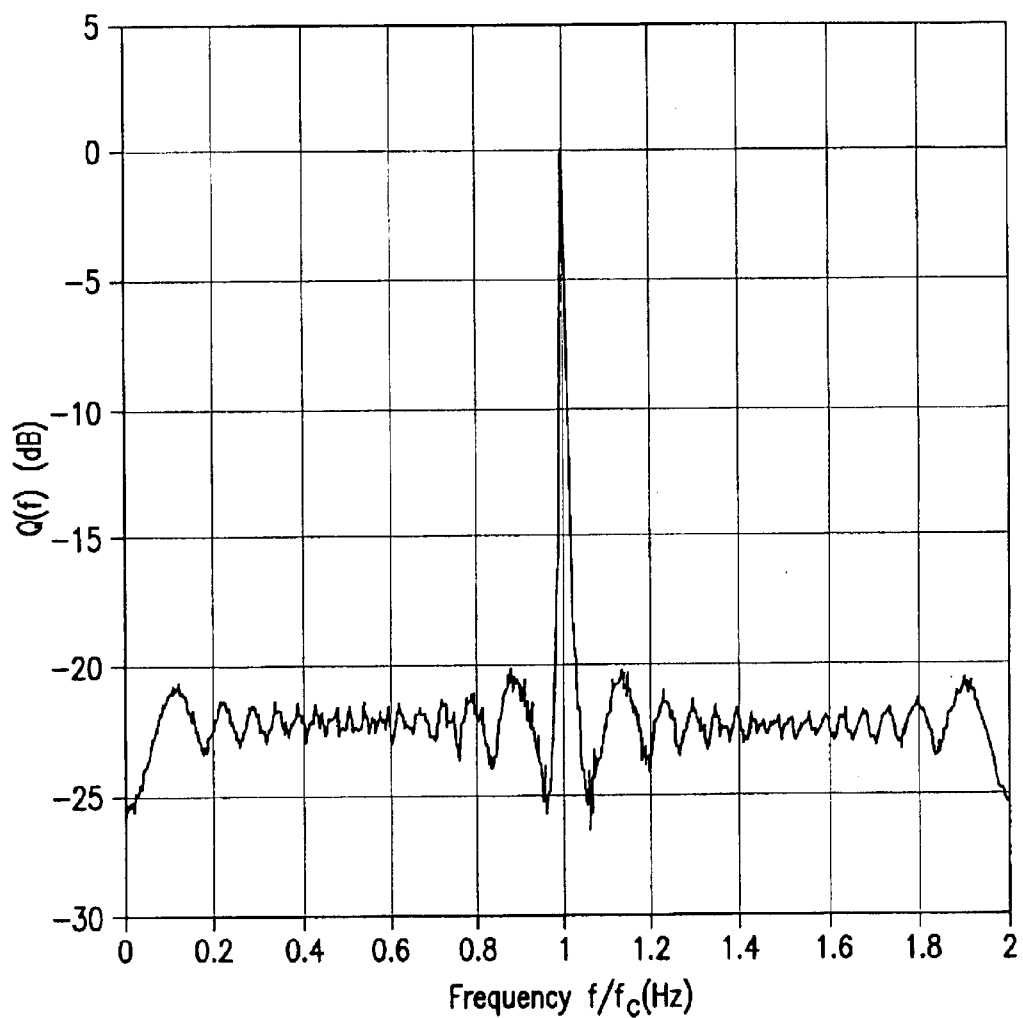
Figure 15:
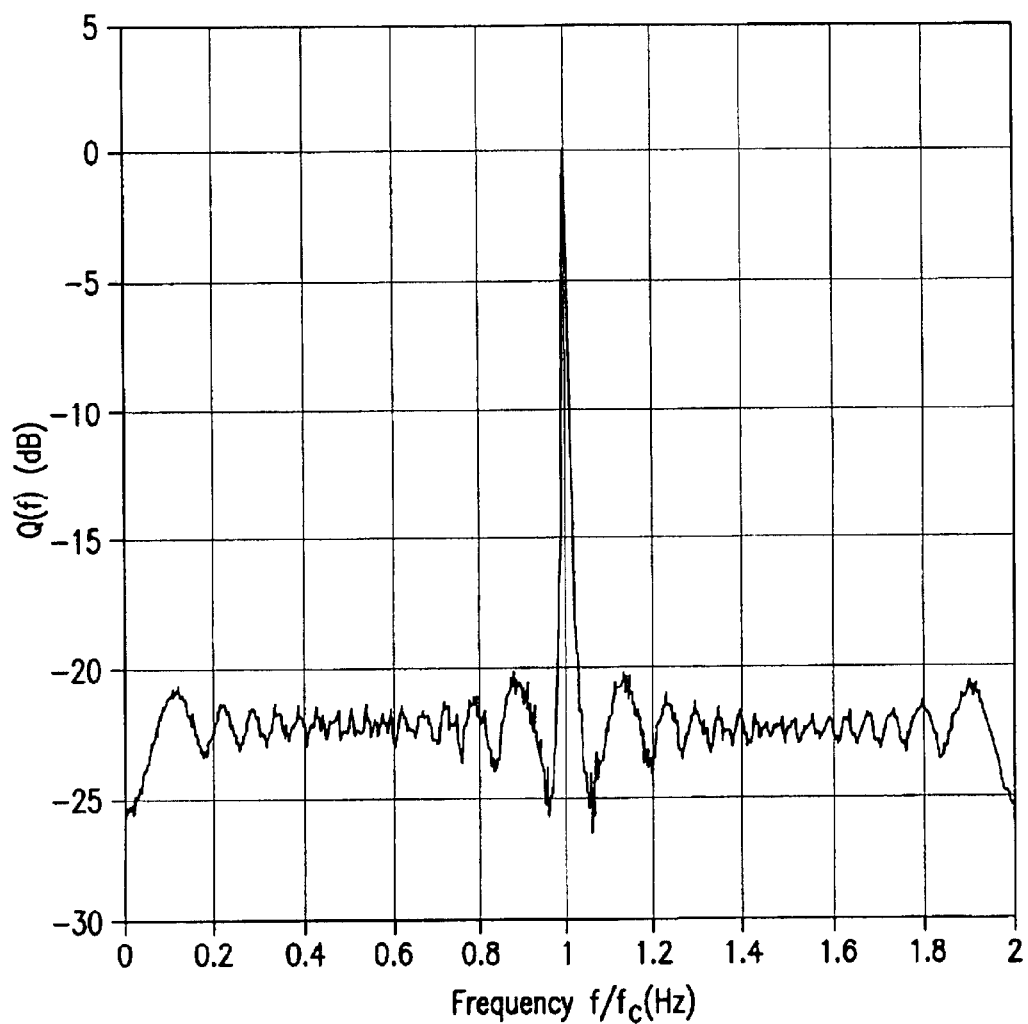
Figure 17A:
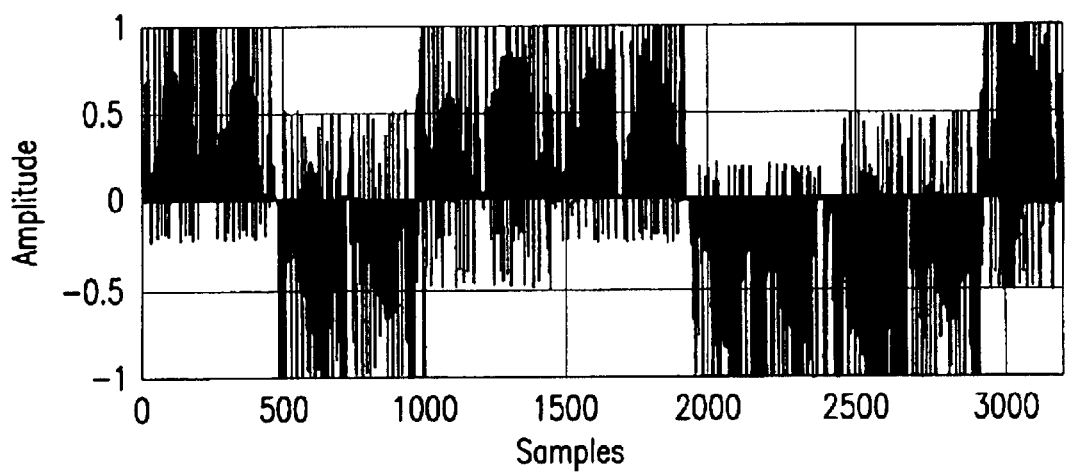
Figure 17B:
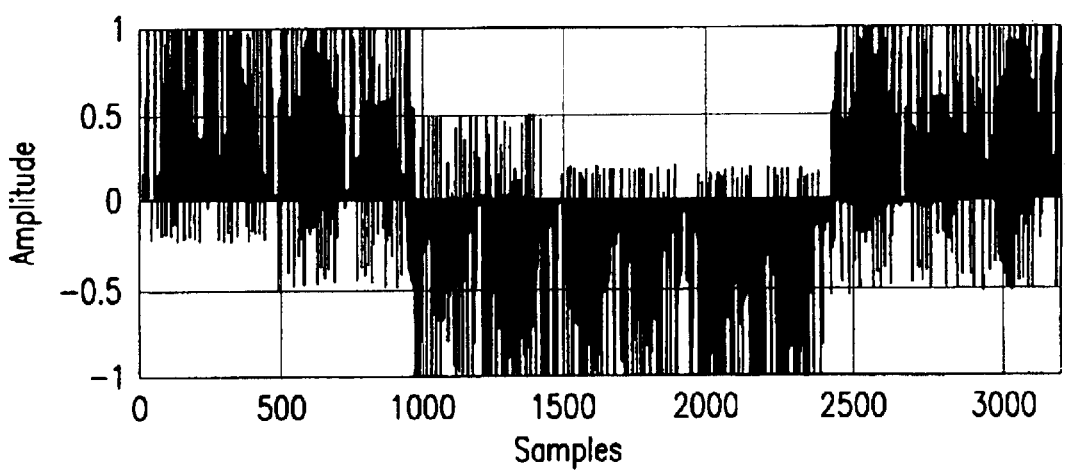
Figure 18A:
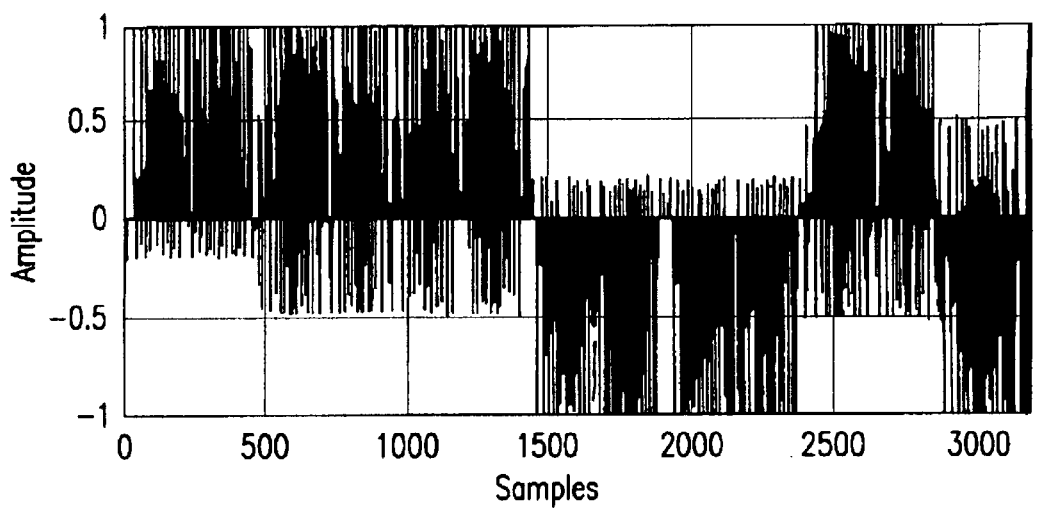
Figure 18B:
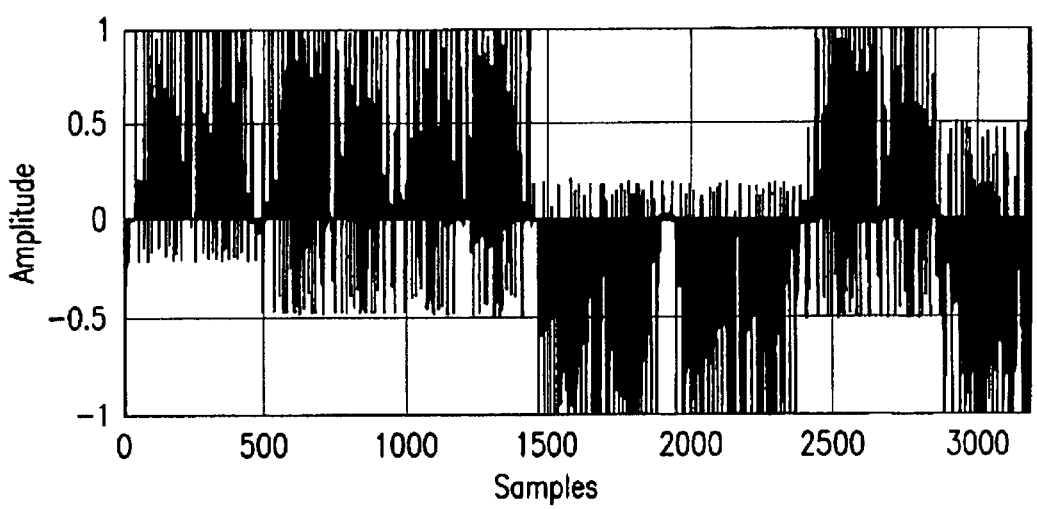
Figure 19:
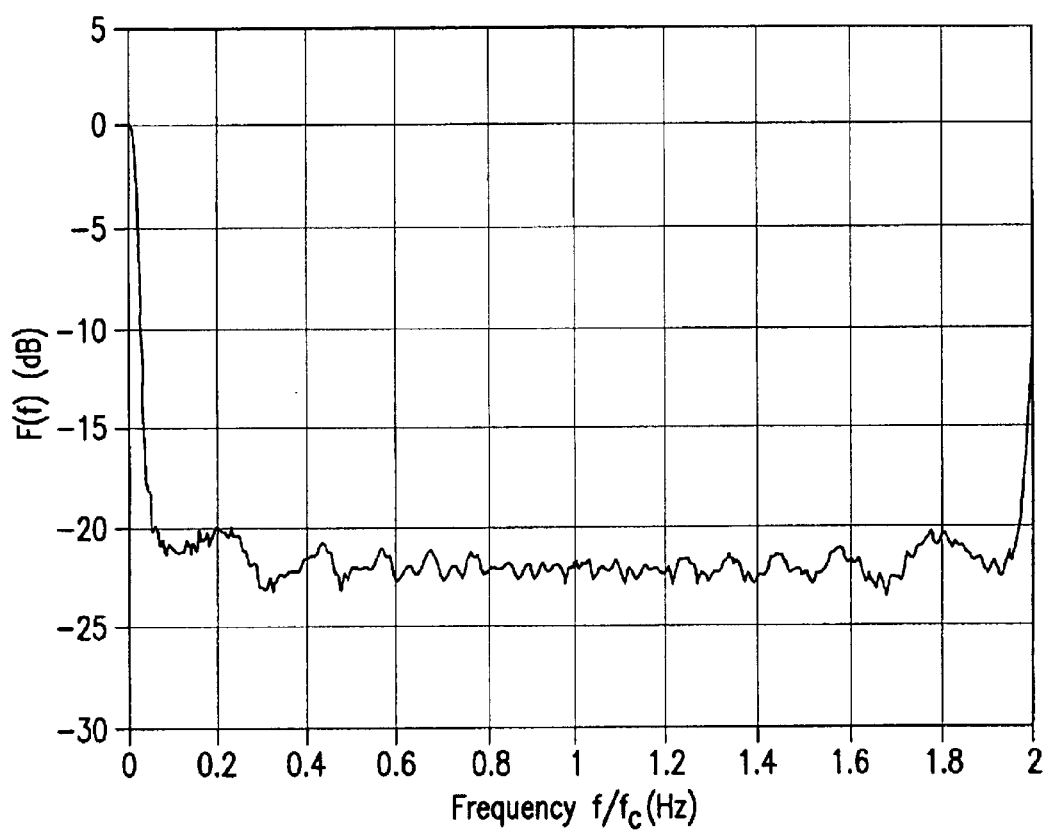
Figure 22:
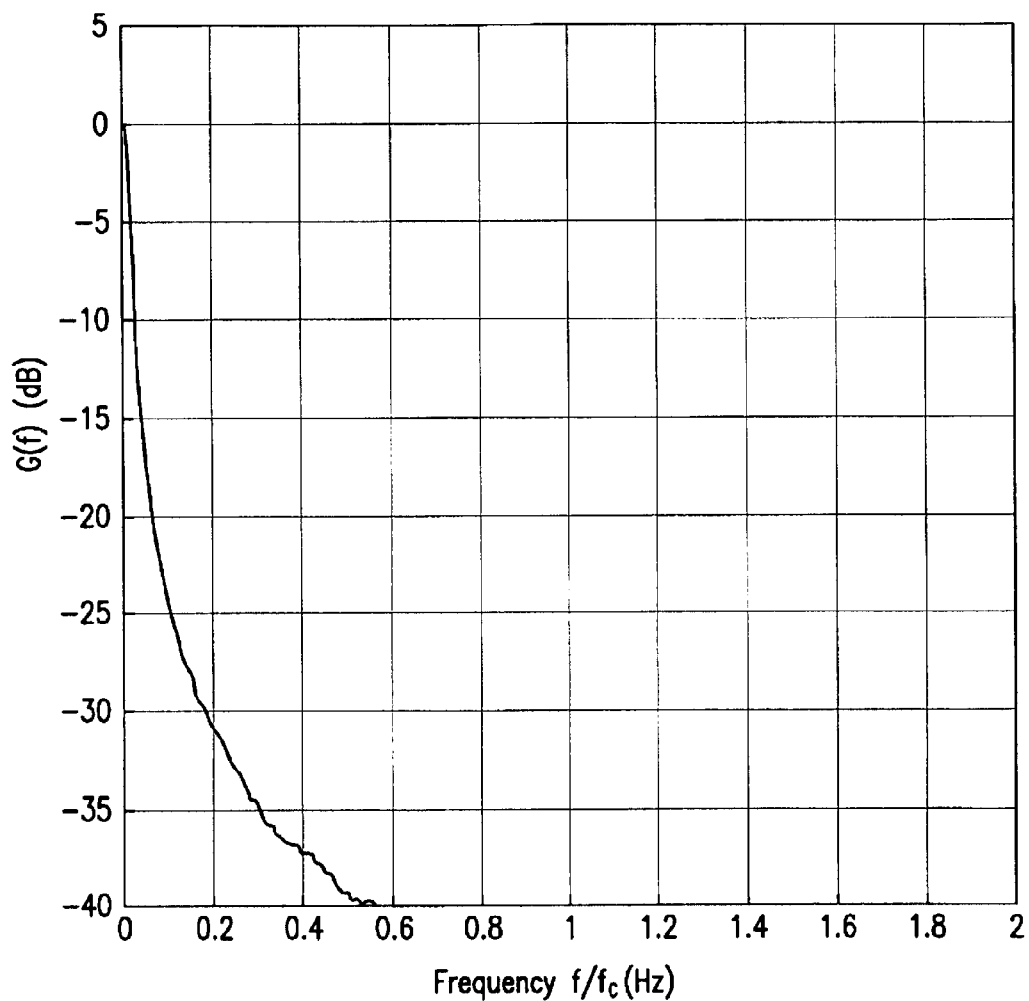
Figure 23:
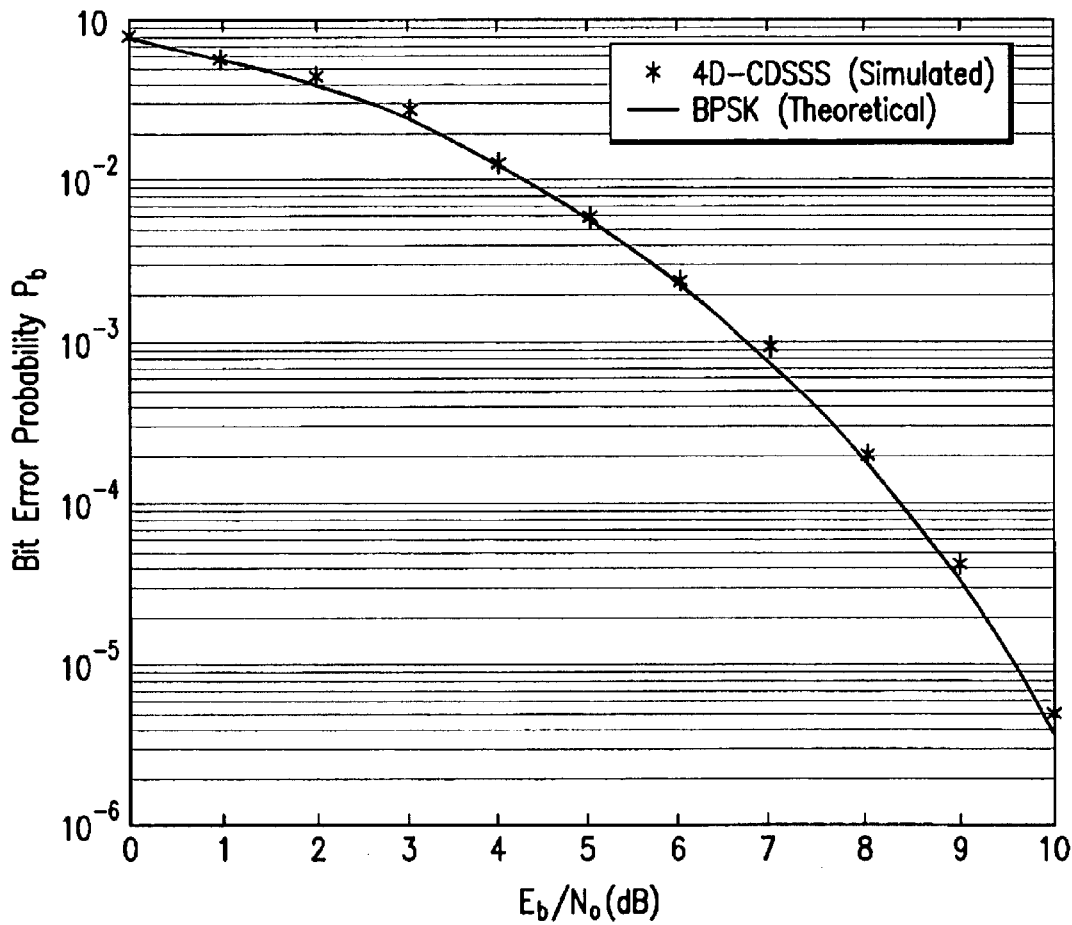
Figure 24:
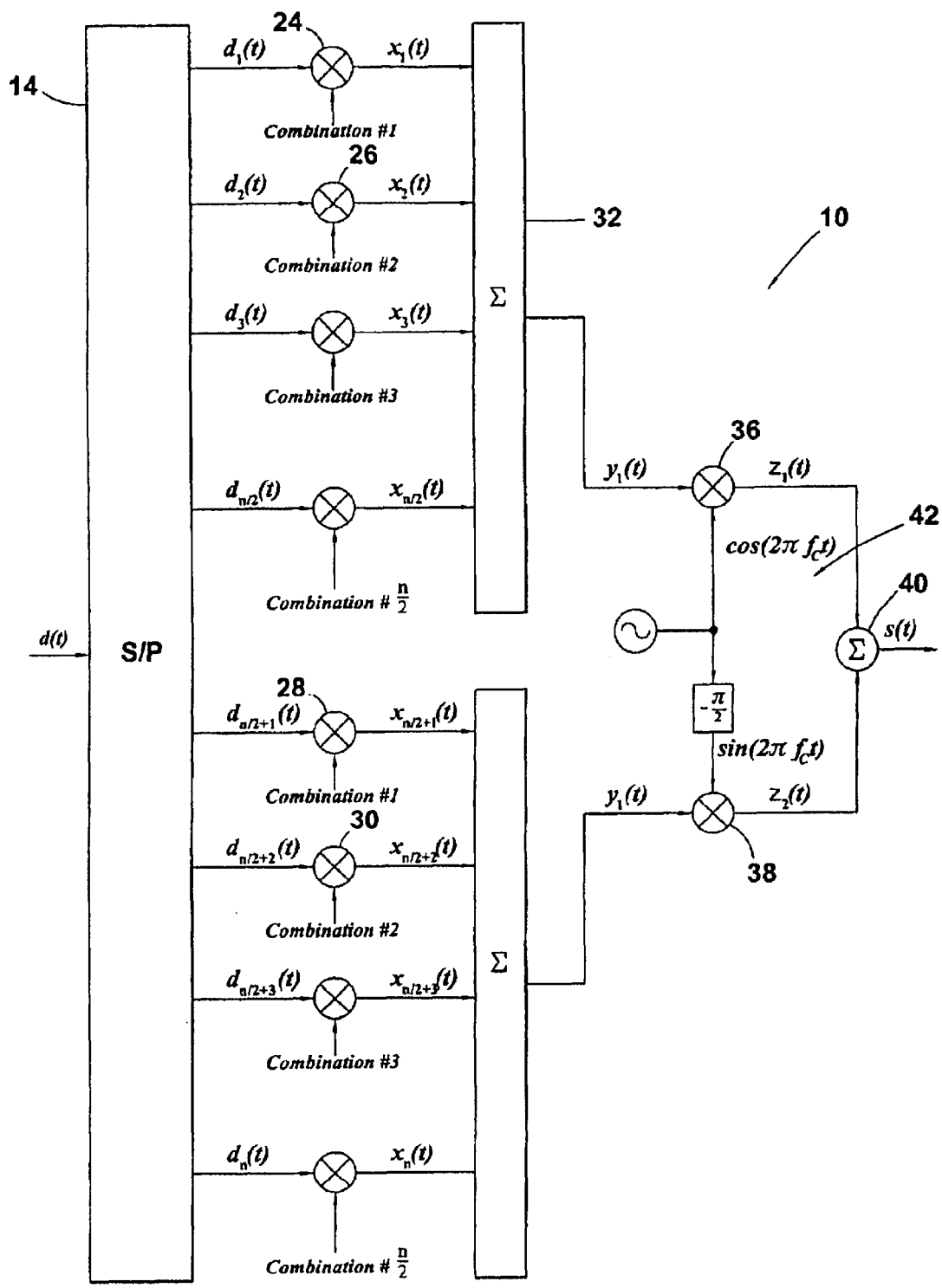
Figure 25:
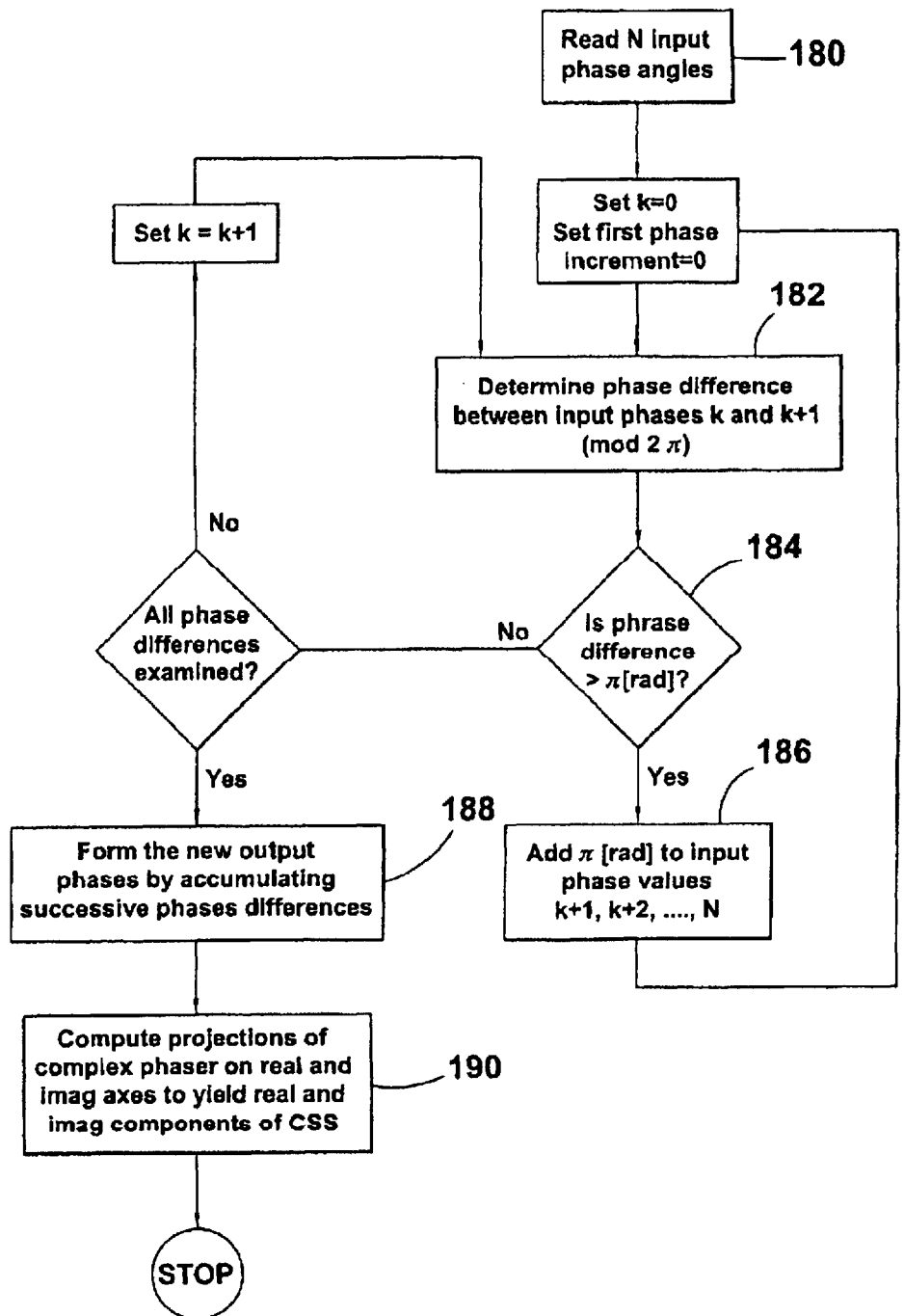
Figure 26:
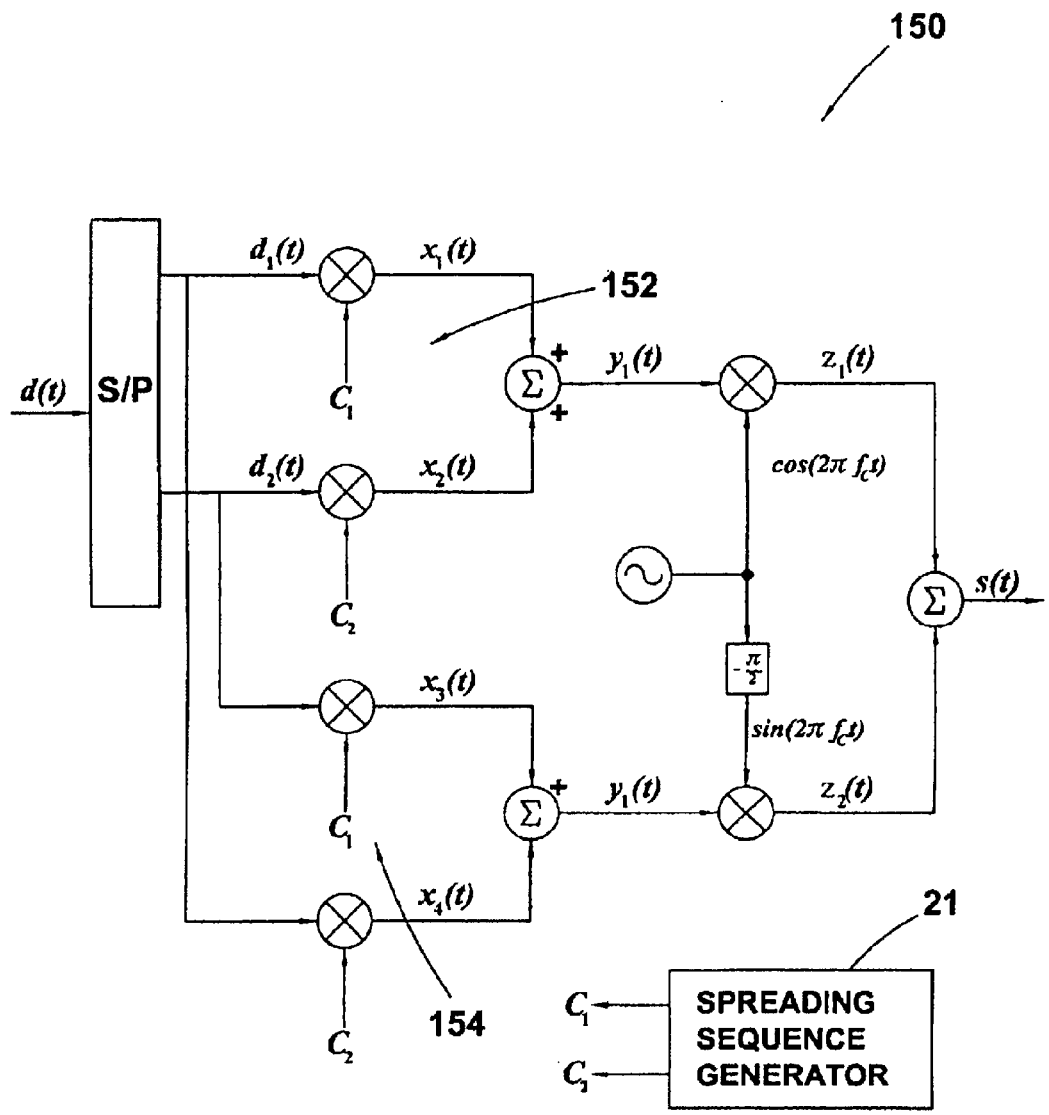

FIGS. 5($a$), to 5($e$) are representations of an input bipolar data signal or stream d(t) which is split into four signals $d_1(t)$, $d_2(t)$, $d_3(t)$ and $d_4(t)$, one for each of the four branches of the four-dimensional modem in FIG. 1;

FIGS. 6($a$) and 6($b$): are representations of spreading sequences $C_r$–$C_i$ and –$C_r$ –$C_i$ respectively, formed by combinations of the real and imaginary parts of a complex sequence $C_a$;

FIGS. 7($a$), 7($b$) and 7($c$) are representations of the spreaded signals $x_1(t)$ and $x_2(t)$ in FIG. 1 and the sum signal $y_1(t)$ in FIG. 1;

FIGS. 8($a$), 8($b$) and 8($c$) are representations of the spreaded signals $x_3(t)$ and $x_4(t)$ in FIG. 1 and the sum signal $y_2(t)$ in FIG. 1;

FIGS. 9($a$) and 9($b$) show the power spectral density (PSD) of the signals $y_1(t)$ and $y_2(t)$ in FIGS. 7($c$) and 8($c$) respectively;

FIGS. 10($a$), ($b$) and ($c$) show the modulated signals $z_1(t)$ and $z_2(t)$ and the final output signal s(t) of the modulator respectively in FIG. 1;

FIG. 11 shows the PSD of signal $z_1(t)$ in FIG. 1;

FIG. 12 shows the PSD of signal $z_2$ in FIG. 1;

FIG. 13 shows the PSD of the output signal s(t) in FIG. 1;

FIG. 14 shows the PSD of despreaded signal $u_1(t)$ in the demodulator in FIG. 3;

FIG. 15 shows the PSD of despreaded signal $u_2(t)$ in the demodulator in FIG. 3;

FIGS. 16($a$) and 16($b$) are time domain representations of the despreaded signals $u_1(t)$ and $u_2(t)$ in FIG. 3;

FIGS. 17($a$) and 17($b$) are time domain representations of the down-converted signals $f_1(t)$ and $f_2(t)$ respectively in FIG. 3;

FIGS. 18($a$) and 18($b$) are time domain representations of the down-converted signals $f_3(t)$ and $f_4(t)$ respectively in FIG. 3;

FIG. 19 shows the PSD of the signal $f_1(t)$ in FIG. 3;

FIGS. 20($a$) and 20($b$) show the signals $g_1(t)$ and $g_2(t)$ at the outputs of the integrators in FIG. 3;

FIGS. 21($a$) and 21($b$) show the signals $g_3(t)$ and $g_4(t)$ at the outputs of the integrators in FIG. 3;

FIG. 22 shows the PSD of signal $g_1(t)$ in FIG. 3;

FIG. 23 is a diagram comparing the bit error rate (BER) of the modem according to the invention in the presence of additive white Gaussian noise with the theoretical value for BPSK;

FIG. 24 is a block diagram of the modulator according to the invention extended to n dimensions;

FIG. 25 is a flow diagram illustrating generation of a complex sequence $C_a$ for use by the modulator and demodulator;

FIG. 26 is a block diagram of a single side-band modulator according to the invention; and table 1 is a table of the values of the composite spreading sequences shown in FIGS. 6($a$) and 6($b$).

DESCRIPTION OF A PREFERRED EMBODIMENT OF THE INVENTION

This invention relates to a coherent multi-dimensional direct sequence spread spectrum (DSSS) modem employing complex spreading sequences. As an example, a four dimensional coherent modulator for a four dimensional modem is shown at 10 in FIG. 1. A block diagram of a four dimensional demodulator forming part of the modem is shown at 12 in FIG. 2.

As shown in FIG. 1, the modulator 10 comprises a serial to parallel converter 14 for converting a serial bipolar input signal d(t) into four parallel data streams $d_1(t)$, $d_2(t)$, $d_3(t)$ and $d_4(t)$, one for each of the four branches 16, 18, 20, 22 of the modulator. A typical input signal d(t) and the resulting four data streams $d_1(t)$, $d_2(t)$, $d_3(t)$ and $d_4(t)$ are shown in FIG. 5. In other embodiments two or more (depending on the dimension of the modem) synchronized independent parallel input data streams may be used. In such a case the converter 14 would be redundant and will not form part of the modulator. The data streams may relate to any one or more of raw data, audio signals or video signals.

The modulator comprises a spread spectrum sequence generator 21 which utilizes a set of complex root-of-unity filtered sequences $C_a, C_b \ldots C_n$, each comprising a respective real part $C_{ra}$ for example, and an imaginary part $C_{ia}$ for example, to generate a plurality of spreading sequences $C_1$, $C_2$, $C_3$ . . . . Each spreading sequence comprises a combination, preferably an arithmetic sum, of at least two of said real parts and said imaginary parts. Hence, in one example the first spreading sequence $C_1 = C_{ra} - C_{ia}$ and the second spreading sequence $C_2 = -C_{ra} - C_{ia}$. The spreading sequences must be substantially mutually orthogonal and are selected such that the auto correlation properties of the spreading sequences are optimized.

The generation and nature of the complex root-of-unity filtered sequences $C_a$ to $C_n$ used in the modem according to the invention are fully described in the complete specification of SA Patent 96/0355 in the name of University of Pretoria and entitled "Spread Spectrum Modulator and Method". The relevant parts of the complete specification are incorporated by reference herein.

By way of a brief summary, the generator 21, in use, generates complex sequences $C_a \ldots C_n$. The sequences are based on the well known Frank-Zadoff-Chu (FZC) and Generalized Chirp-Like (GCL) sequences and are formed by taking samples in a specific manner from a phasor rotating on a unit circle. The $r^{th}$ FZC sequence is defined by $$A_{r,k} = \begin{cases} w_N^{kk/2+qk} & N \text{ even} \\ w_N^{k(k+1)/2+qk} & N \text{ odd} \end{cases}$$

wherein $W_N$ denotes a complex root of unity, of the form $$W_N = e^{-j2\pi r/N}$$

r is any integer relatively prime to N
N is the number of samples on the unit circle;
k=0,1,2 . . . N−1 denotes the samples or chips on the unit circle; and
q is any integer.

In unprocessed form the aforementioned FZC and Generalized chirp-like sequences are not band limited and have noise-like power spectral densities. The generator 21 processes and root-of-unity filters the input FZC sequences to yield a family of spreading sequences which are band limited.

As illustrated in FIG. 25 at 180, the generator 21 accepts as inputs the phase angles of the $r^{th}$ FZC sequence comprising N chips or samples of the rotating phasor on the unit circle.

As first step at 182, the differences in phase between successive samples are determined and reduced mod $2\pi$, to yield a sequence of numbers representing phase differences between successive samples. Mathematically, this step may be described as follows:

$$\Delta\phi_{k,k+1} = (\phi_{k+1} - \phi_k) \mod 2\pi; \ k=1,2 \ldots N$$

These phase differences may be utilized and interpolated on the unit circle to yield the complex sequence which will be band limited and which has good auto and cross correlation properties. If analytical complex sequences are required, the following additional steps must also be performed.

As a second step at 184, the phase differences are examined. If the value of a phase difference is greater than $\pi$ rad, another $\pi$ rad is added to the input phase angle as well as to all subsequent input phase angles as is illustrated at 186. This may be described by:

$$\phi_j = \phi_j + \pi; \ j=k+1, k+2 \ldots N$$

Thirdly, this procedure is again followed by the calculation of phase differences and mod $2\pi$ reduction thereof, to yield a sequence of successive phase differences that are smaller than $\pi$ rad. Steps two-and three are repeated until all the resulting phase differences are less than $\pi$ rad.

A new set of resulting phase angles is then determined spaced by the resulting phase differences as illustrated at 188. A new sequence of samples is then determined utilizing the new set of resulting phase angles.

The operation of the aforementioned processing may be illustrated by a simplified example. Let the angles of rotation of the phasor, sampled at discrete intervals, be as follows:

$$\{0, 0.7\pi, 1.9\pi, 3.95\pi, 8.1\pi, 17.5\pi\} \quad (A)$$

In the first step of the processing, the phase differences between successive input values are determined, with the first value set to zero, i.e.;

$$\{0, 0.7\pi, 1.2\pi, 2.05\pi, 4.15\pi, 9.4\pi\} \quad (B)$$

These values are then reduced mod $2\pi$ to yield $$\{0, 0.7\pi, 1.2\pi, 0.05\pi, 0.15\pi, 1.4\pi\} \quad (C)$$

This sequence of phase differences is then examined for phase differences that exceed $\pi$ rad. If this is the case, $\pi$ rad is added to all successive input phase values in (A). This changes the input sequence (A) to:

$$\{0, 0.7\pi, (1.9+1)\pi, (3.95+1)\pi, (8.1+1)\pi, (17.5+1)\pi\} \quad (D)$$

or $$\{0, 0.7\pi, 2.9\pi, 4.95\pi, 9.1\pi, 18.5\pi\} \quad (E)$$

Determining the difference in phase between successive samples would then yield a new version of (B), namely:

$$\{0, 0.77\pi, 2.2\pi, 2.05\pi, 4.15\pi, 9.4\pi\} \quad (F)$$

which, when reduced mod $2\pi$, gives the following set of phase differences (the new version of (C)):

$$\{0, 0.7\pi, 0.2\pi, 0.05\pi, 0.15\pi, 1.4\pi\} \quad (G)$$

The whole process is carried out recursively until all phase differences are smaller than $\pi$ rad. Thus, using (E) as the new input sequence, and (G) as the sequence of phase differences, (E) must be modified to yield $$\{0, 0.77\pi, 2.2\pi, 2.05\pi, 4.15\pi, 10.4\pi\} \quad (H)$$

which, when reduced mod $2\pi$, will yield the final set of phase differences, $$\{0, 0.7\pi, 0.2\pi, 0.05\pi, 0.15\pi, 0.4\pi\} \quad (I)$$

The angle of rotation of the phasor is then determined by increasing the value of the angle of rotation by successive values of (I). This yields the following new set of resulting phase angles:

$$\{0, 0.7\pi, 0.9\pi, 0.95\pi, 1.1\pi, 1.5\pi\} \quad (J)$$

From this new set of resulting phase angles, a new sequence of samples on the unit circle is determined.

In order to band limit the sequence generated as hereinbefore described and explained, the new samples are linearly interpolated on the unit circle by an interpolation factor (l). By linear interpolation is meant that l equi-spaced interpolation values between each two samples are determined on the unit circle. Thereafter at 190 the projections of the samples and interpolation values on the real and imaginary axes are determined to yield the complex sequence $C_a$ which is analytical and of length $L=N\times l$.

In a case where l=4, and according to the Nyquist criterion, the normalized bandwidth of the four times oversampled signal should be 0.125 $f_{samp}$. Thus, the aforementioned processing has resulted in a minimum (Nyquist) bandwidth signal with analytical properties.

The dimension of the modem may be increased by providing other suitable combinations of the real and imaginary parts of the complex sequence $C_a$ and/or by utilizing combinations of other complex sequences such as $C_b$, $C_c$ . . . and/or substantially mutually orthogonal time shifted versions of the spreading sequences and/or substantially mutually orthogonal combinations of time shifted versions of the real and imaginary parts of the complex sequence.

Figure 6A:
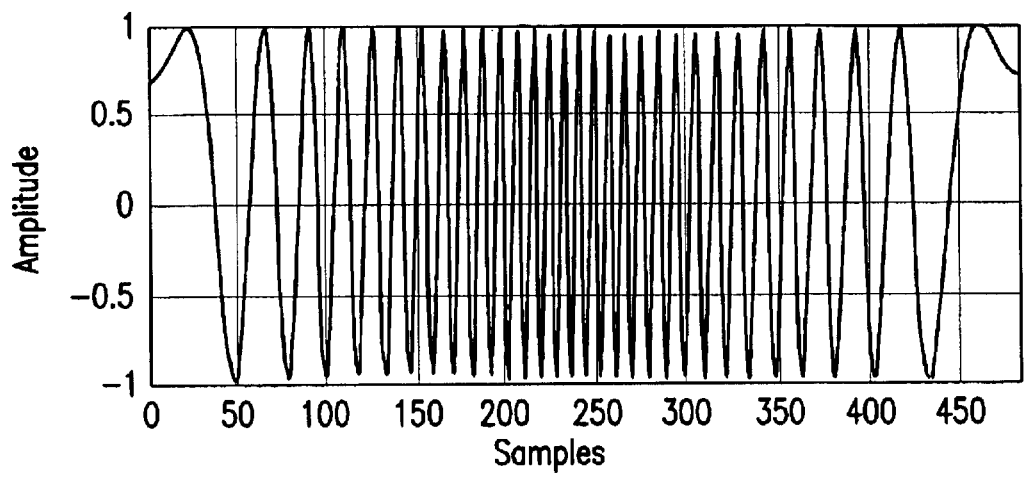
Figure 6B:
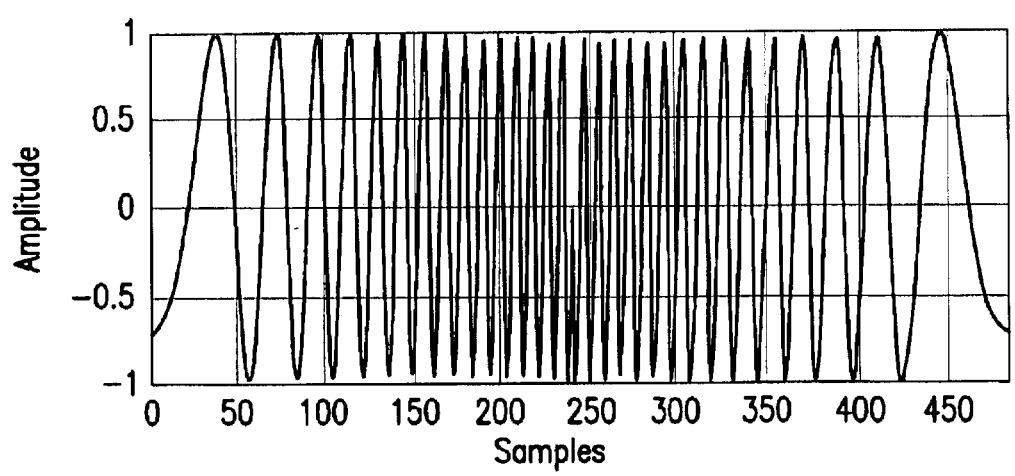

Examples of the combination spreading sequences $C_1$ and $C_2$ are shown in FIGS. 6(a) and 6(b) respectively. In the examples shown the complex sequence $C_a$ is of length N=121 and the samples per chip (spc) are four. The sample numbers and values of $C_{ra}$, $C_{ia}$, $C_1$ and $C_2$, are given in table 1.

Referring to FIG. 1, in first branch 16, there is provided a multiplier 24 having a first input 24.1, a second input 24.2 and an output 24.3. The multiplier multiplies the signal $d_1(t)$ at the first input 24.1 with a first spreading sequence $C_1$ at the second input 24.2, to yield at output 24.3 a frequency spreaded signal $x_1(t)$. In the second branch 18, signal $d_2(t)$ is multiplied by multiplier 26 with the second spreading sequence $C_2$, to yield a frequency spreaded signal $x_2(t)$. Similarly, in branch 20 signal $d_3(t)$ is multiplied by multiplier 28 with the aforementioned spreading sequence $C_1$ to yield frequency spreaded signal $x_3(t)$ and in branch 22, signal $d_4(t)$ is multiplied by multiplier 30 with the aforementioned spreading sequence $C_2$, to yield spreaded signal $x_4(t)$.0.

Figure 7A:
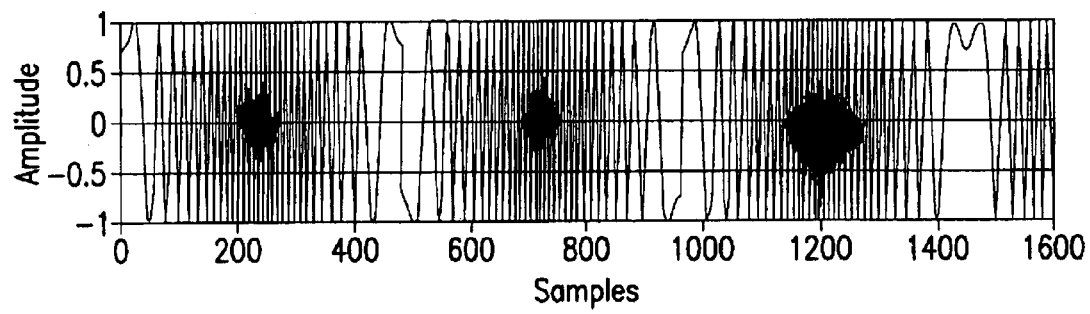
Figure 7B:
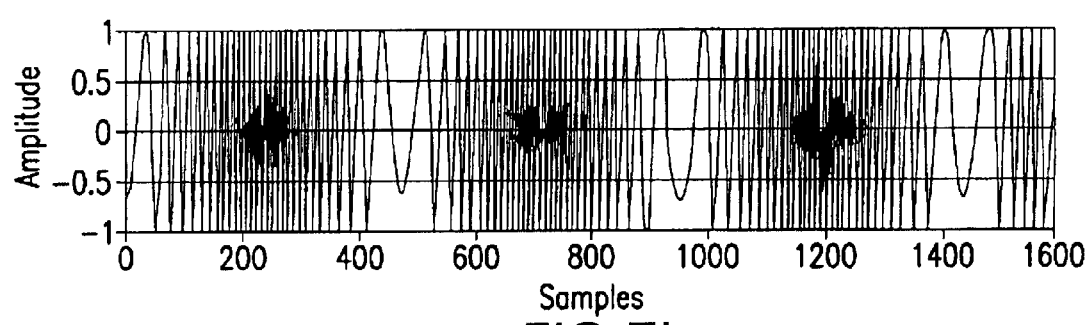
Figure 7C:
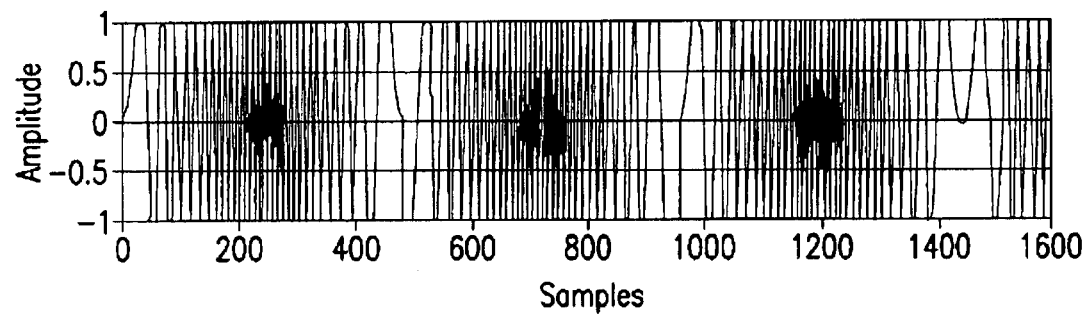
Figure 8A:
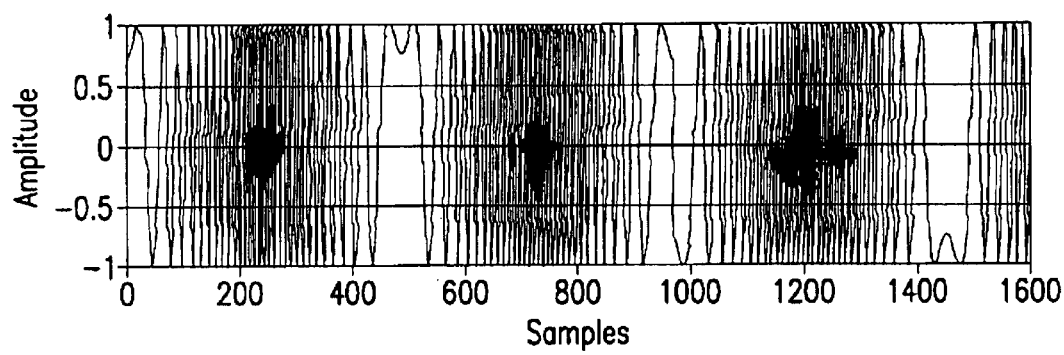
Figure 8B:
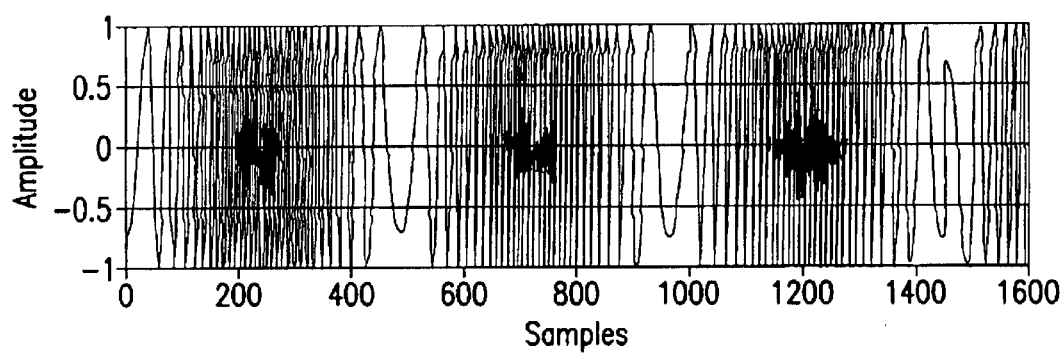
Figure 8C:
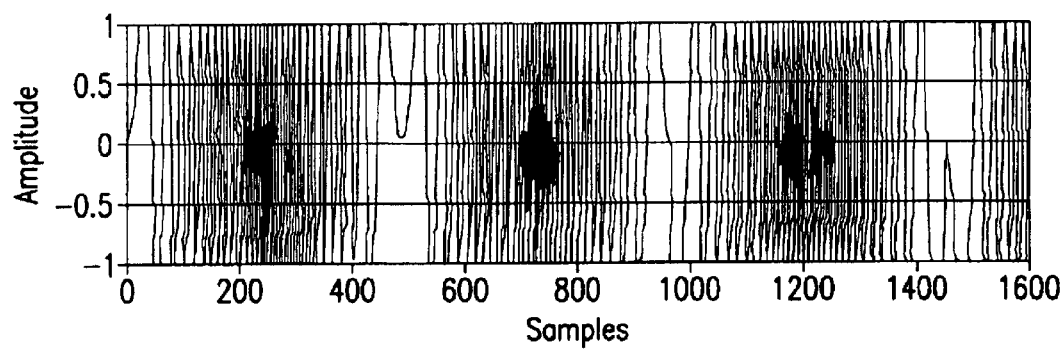

Signals $x_1(t)$ and $x_2(t)$ are added by adder 32, to yield signal $y_1(t)$ and signals $x_3(t)$ and $x_4(t)$ are added by adder 34, to yield signal $y_2(t)$. Representations of signals $x_1(t)$, $x_2(t)$ and $y_1(t)$ are shown in FIGS. 7(a), 7(b) and 7(c) respectively and representations of signals $x_3(t)$, $x_4(t)$ and $y_2(t)$ are shown in FIGS. 8(a), 8(b) and 8(c) respectively.

Figure 9A:
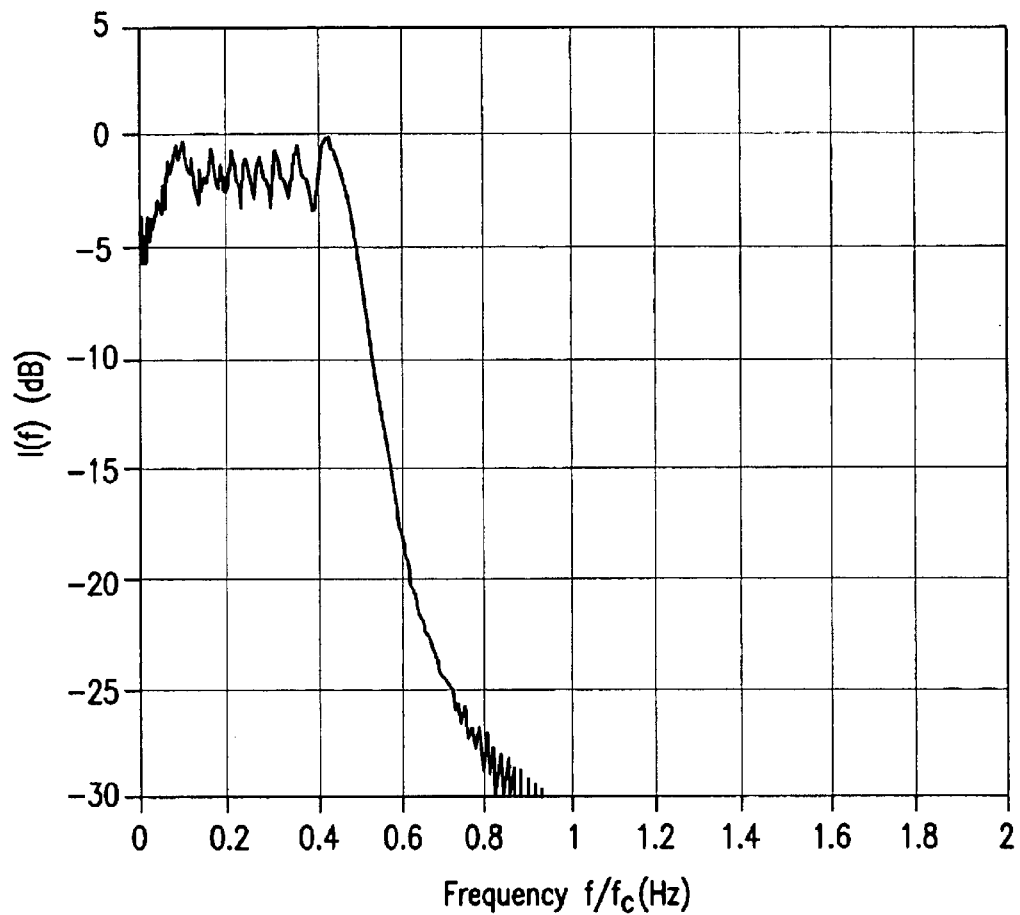
Figure 9B:
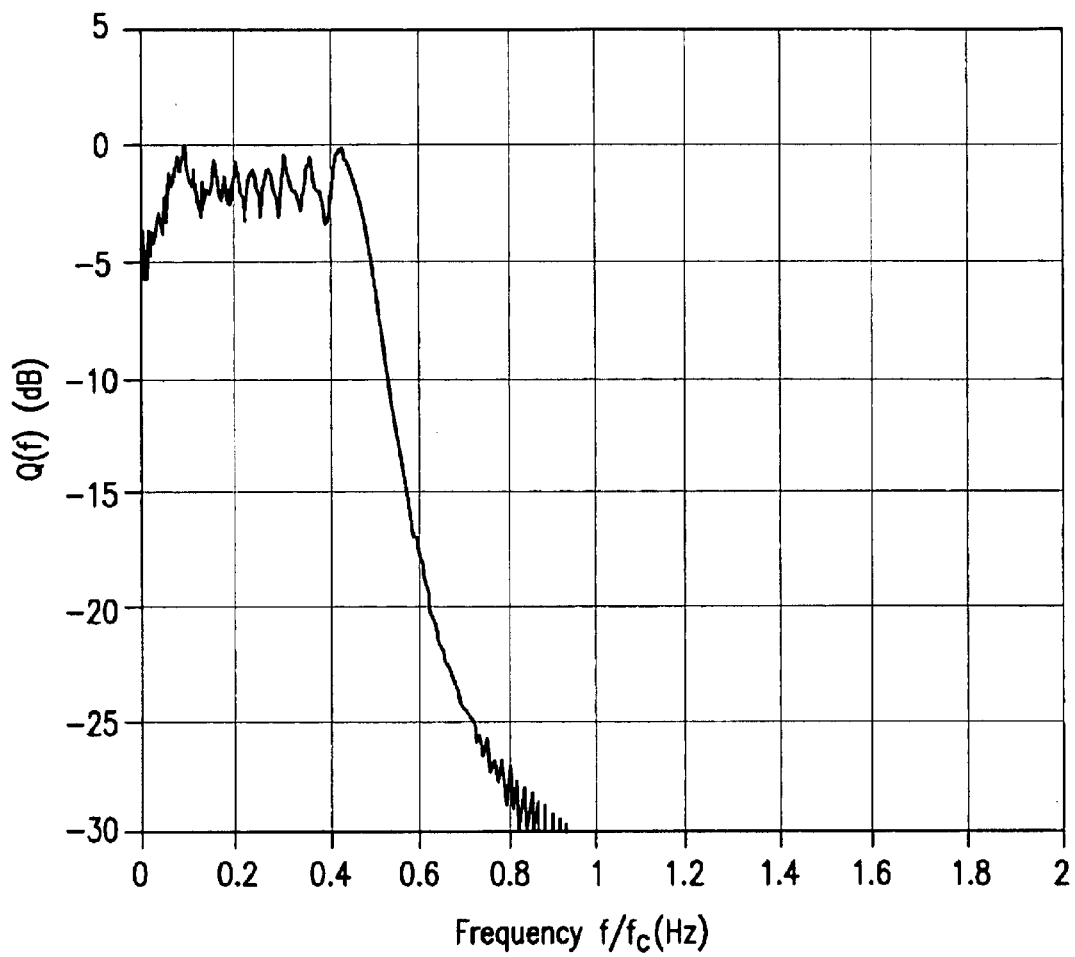

The power spectral density (PSD) of baseband signal $y_1(t)$ is shown in FIG. 9(a), while the PSD of baseband signal $y_2(t)$ is shown in FIG. 9(b).

Referring to FIG. 1, signals $y_1(t)$ and $y_2(t)$ at inputs 36.1 and 38.1 of quadrature modulator 42, are modulated with quadrature carriers (cos $\omega_c t$ and sin $\omega_c t$) by multipliers 36 and 38 respectively, to yield mutually orthogonal signals $z_1(t)$ and $z_2(t)$.

Figure 10A:
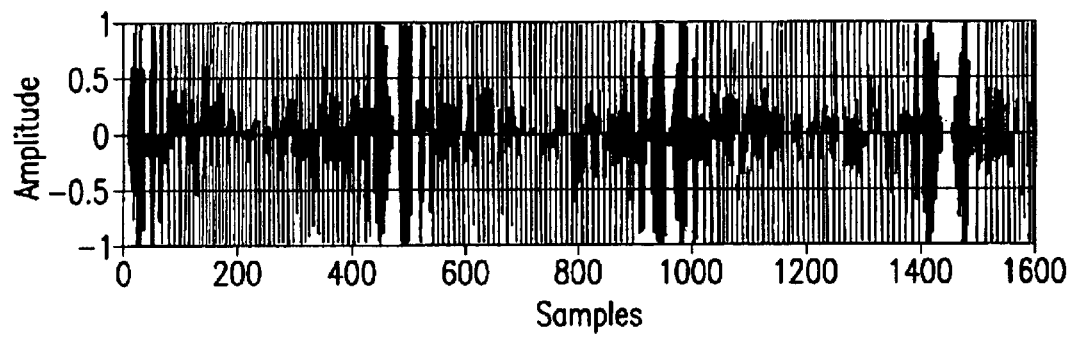
Figure 10B:
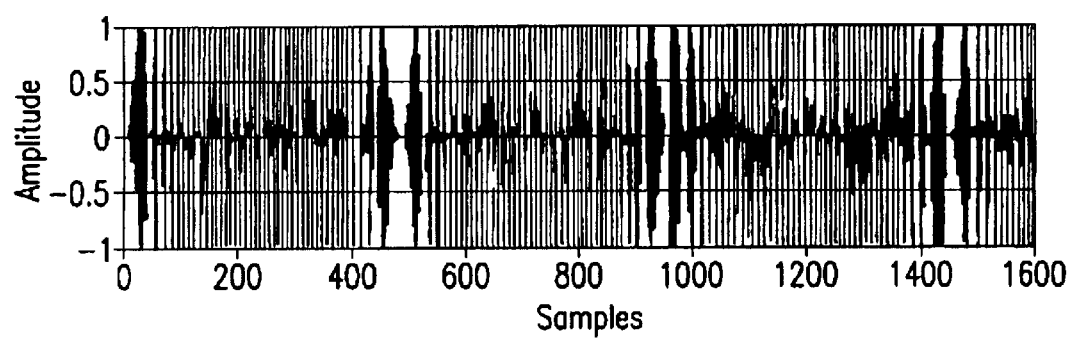
Figure 10C:
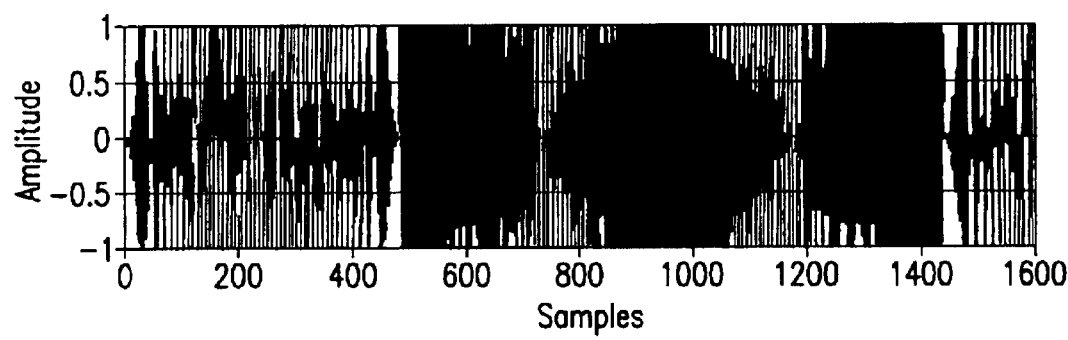

The signals $z_1(t)$ and $z_2(t)$ are added by output adder 40, to yield modulator output signal s(t). Representations of the modulated signals $z_1(t)$, $z_2(t)$ and output signal s(t) are shown in FIGS. 10(a), 10(b) and 10(c) respectively.

The PSD of modulated signal $z_1(t)$ on the cosine carrier is shown in FIG. 11, the PSD of modulated signal $Z_2(t)$ on the sine carrier is shown in FIG. 12 and the PSD of the frequency spreaded modulator output signal $$s(t) = (d_1(t) C_1 + d_2(t) C_2) \cos \omega_c t + (d_3(t) C_1 + d_4(t) C_2) \sin \omega_c t$$

is shown in FIG. 13.

The modulator 10 provides a constant envelope output signal s(t) which means that the output power is constant as a function of time. Hence a high efficiency, non-linear power amplifier may be used at the output of the modulator. These features are expected to give an advantage in high speed (fading) mobile environments, in terms of system performance at a given data rate and channel bandwidth.

Figure 2:
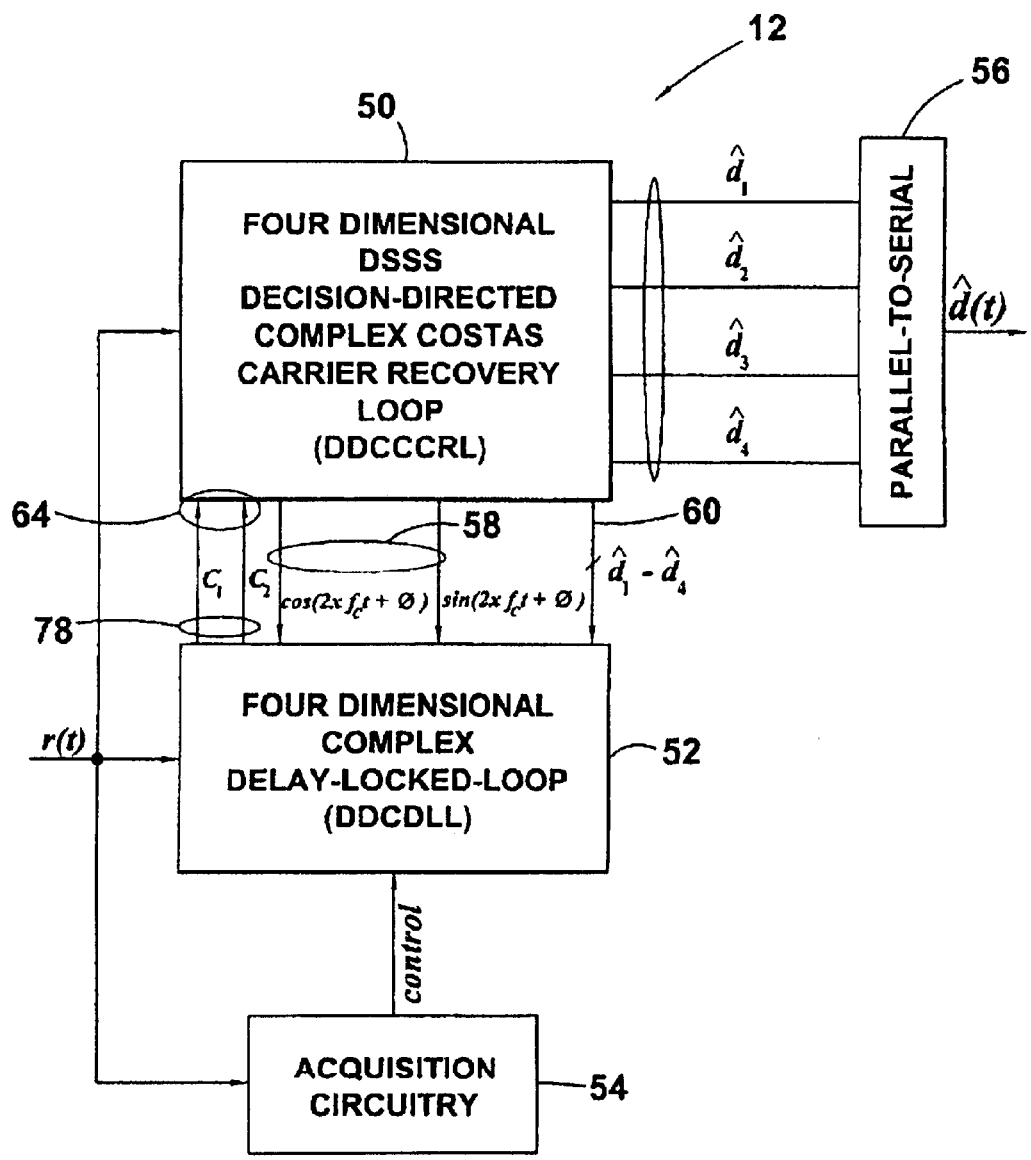
FIG. 2 is a block diagram of a four-dimensional DSSS demodulator forming part of the modem according to the invention.

The demodulator of the modem is shown at 12 in FIG. 2. The incoming spread spectrum signal r(t) is fed to three circuits. The first circuit is a four dimensional DSSS decision-directed complex Costas carrier recovery loop (DDCCCRL) 50, the second is a four dimensional decision-directed complex delay-locked-loop (DDCDLL) 52 and the third is acquisition circuitry 54. Four of the outputs of the circuit 50 are the recovered data streams $d_1$, $d_2$, $d_3$ and $d_4$. A parallel to serial converter 56 is utilized to convert these parallel streams into the received and demodulated version d(t) of the input signal d(t) at the modulator shown in FIGS. 1 and 5.

The DDCCCRL circuit 50 is shown in more detail in FIG. 3. The DDCCCRL 50 is responsible for recovering the incoming quadrature carriers on which the spreaded data is modulated. As shown in FIGS. 2 and 3, it has two sets of outputs namely a first, shown at 58, for the recovered sine and cosine carriers and a second (shown at 60) for the recovered data streams. It also has an input 64 for synchronized despreading sequences $C_1$ and $C_2$ generated by the despreading sequence generator 62 (shown in FIG. 4, either by reading them out from a memory arrangement in which they have been pre-stored or by generating them in real time by a suitable algorithm) of the DDCDLL 52, to despread the incoming signal r(t) at 66 and 68, before demodulating it by means of the aforementioned recovered cosine and sine carrier signals at 70, 72, 74 and 76.

Figure 4:
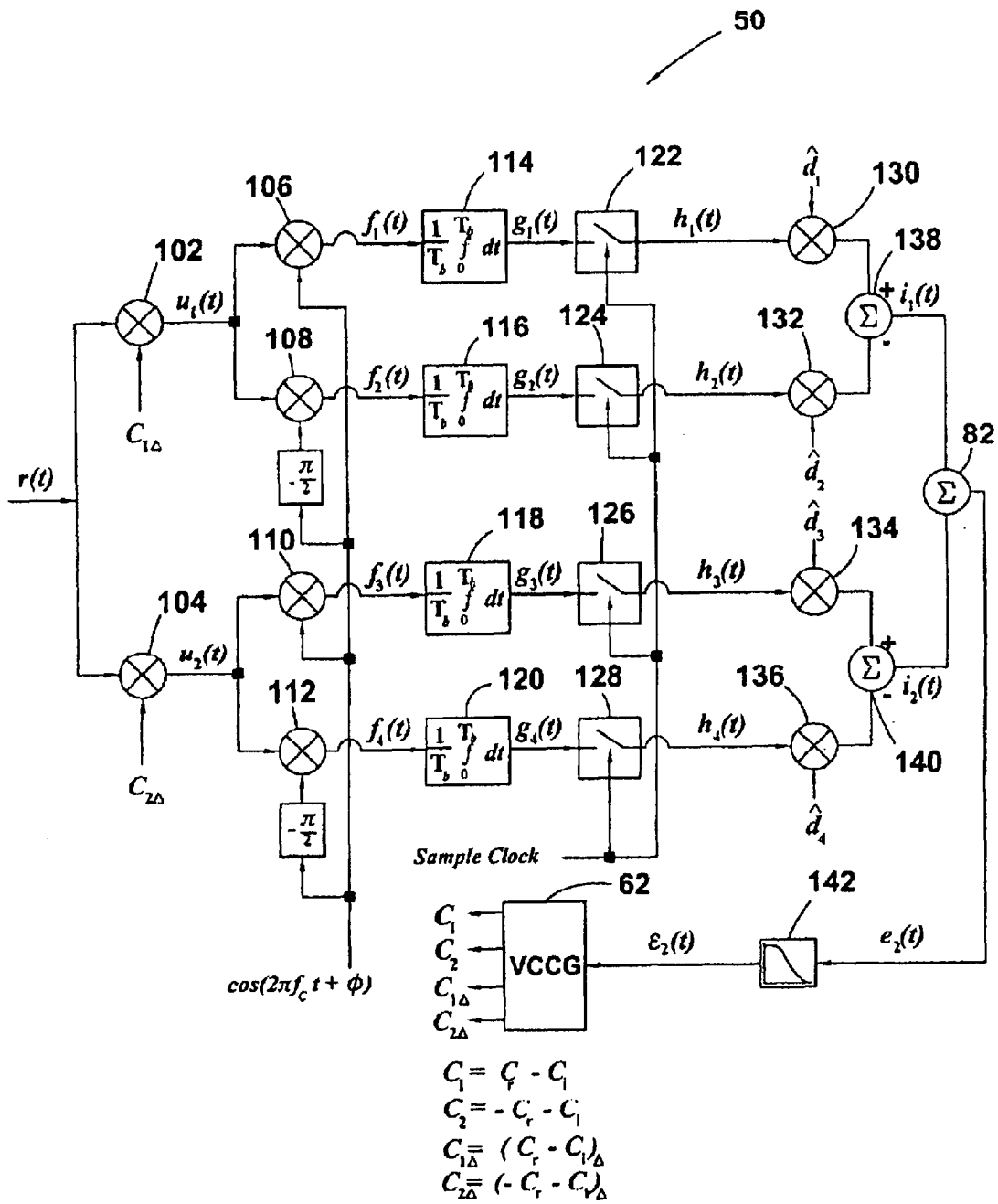
FIG. 4 is a block diagram of a four-dimensional DSSS decision-directed complex delay-locked-loop (DDCDLL) forming part of the demodulator.

The purpose of the DDCDLL circuit 52 shown in FIGS. 2 and 4 is to track the spreading sequences in the signal r(t) and to synchronize them with the aforementioned despreading sequences generated locally for use in despreading the signal. The synchronized despreading sequences are provided via output 78 to the DDCCCRL 50, for despreading as aforesaid.

The code acquisition circuitry 54 is used to perform coarse synchronization only, between the incoming spreading sequences and the despreading sequences generated at the demodulator, after which the DDCDLL 52, by means of voltage controlled code generator (VCCG) 62, does the synchronization of the sequences to within one chip period.

The DDCCCRL 50 and DDCDLL 52 operate as a unit, or as one integrated recovery loop. This combined structure simultaneously recovers the cosine and sine carriers, synchronizes the locally generated despreading sequences and recovers the different data streams $\hat{d}_1(t)$, $\hat{d}_2(t)$, $\hat{d}_3(t)$ and $\hat{d}_4(t)$. The incoming signal r(t) is a multi-dimensional signal comprising a number of independent, spreaded data streams. In the embodiment shown, this demodulator structure 12 first of all, by means of the parallel despreading processes at 66 and 68, obtains the mapping of the incoming signal r(t) on the despreading sequences $C_1$ and $C_2$, to separate the resultant mappings on these sequences. Secondly, the demodulator structure 12 extracts the mappings of the resultant mappings on the cosine and sine carriers at 70 to 76, to produce all the different data streams $d_1(t)$, $d_2(t)$, $d_3(t)$ and $d_4(t)$ originally transmitted. The recovering process of the original transmitted data streams is by means of an auto correlation between the combination spreading sequence used at the modulator 10 to spread the specific data symbol and the corresponding locally generated combination despreading sequence. In the same process a cross correlation is performed between the combination spreading sequence used at the modulator to spread the specific data symbol and the other locally generated combination spreading sequences. Thus, the performance of the system is dependent on the auto- and cross correlation properties of the complex sequences and the spreading sequences $C_1$ and $C_2$. As shown in FIG. 3, the branches in the DDCCCRL 50 are combined at adder 80 and filtered to form a first error signal $e_1(t)$ which is used for the carrier tracking. As shown in FIG. 4, the branches in the DDCDLL 52 are combined at adder 82 and filtered to form a second error signal $e_2(t)$, which is used for the despreading sequence synchronization. Thus, the purpose of this demodulator structure 12 is to separate all the dimensions of the incoming signal r(t).

Figure 16A:
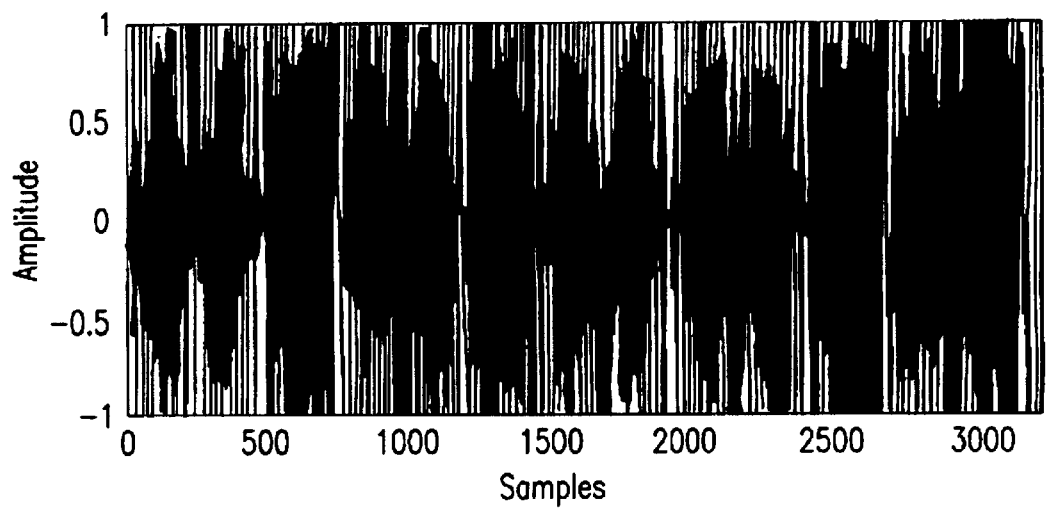
Figure 16B:
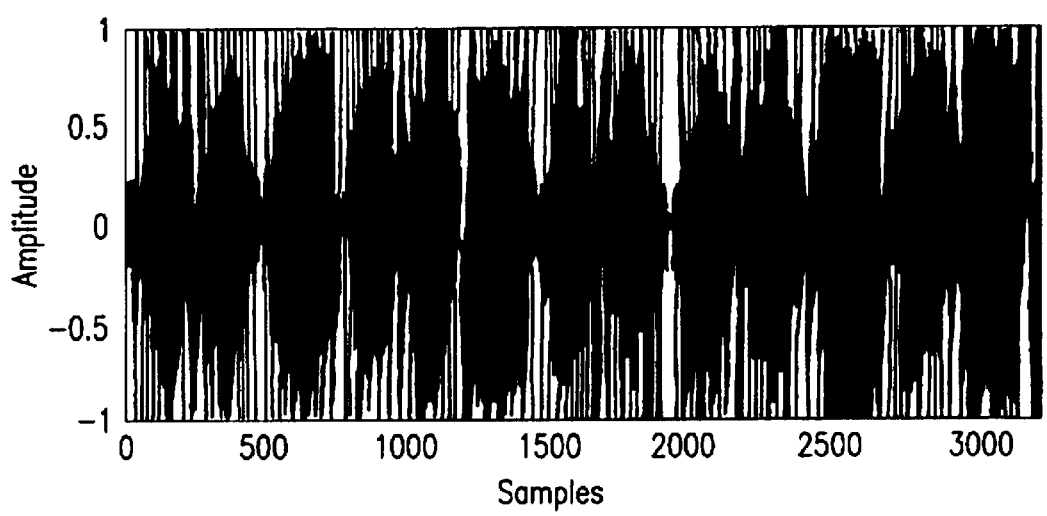

Referring now more particularly to the diagram in FIG. 3, the incoming signal r(t) is despreaded at multipliers 66 and 68 by despreading sequences $C_1$ and $C_2$, which are the same combinations of the complex sequences used at the modulator. The PSD's of the despreaded signals $u_1(t)$ and $u_2(t)$ in FIG. 3 are shown in FIGS. 14 and 15, respectively. Representations of the signals $u_1(t)$ and $u_2(t)$ are shown in FIGS. 16(a) and 16(b), respectively.

After despreading, each signal $u_1(t)$ and $u_2(t)$ is split into respective in-phase and quadrature branches of the DDCCCRL 50 where they are demodulated at multipliers 70, 72, 74 and 76 with the recovered cosine and sine carriers, to yield signals $f_1(t)$, $f_2(t)$ on the one hand and $f_3(t)$ and $f_4(t)$ on the other. Representations of the signals $f_1(t)$, $f_2(t)$, $f_3(t)$ and $f_4(t)$ are shown in FIG. 17(a), FIG. 17(b), FIG. 18(a) and FIG. 18(b) respectively. The PSD of signal $f_1(t)$ is shown in FIG. 19 and it illustrates that a high frequency component at $2 \times f_c$ is still present, where $f_c$ is the carrier frequency.

Figure 20A:
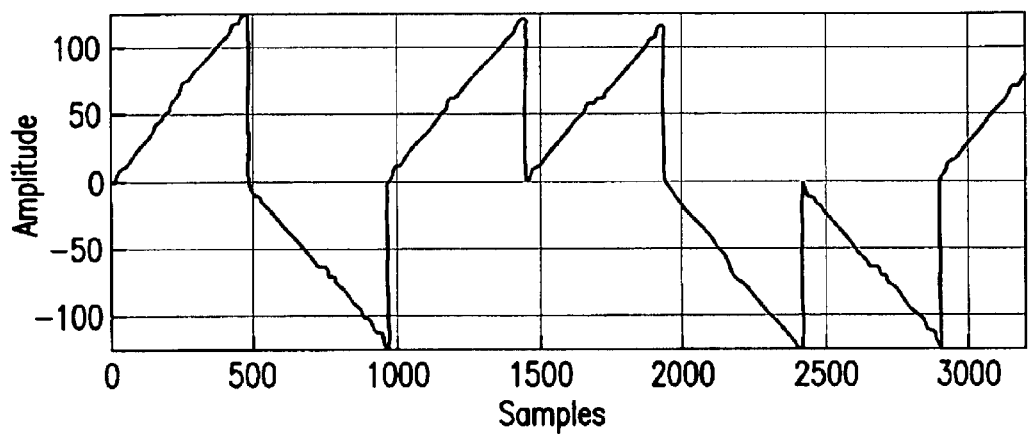
Figure 20B:
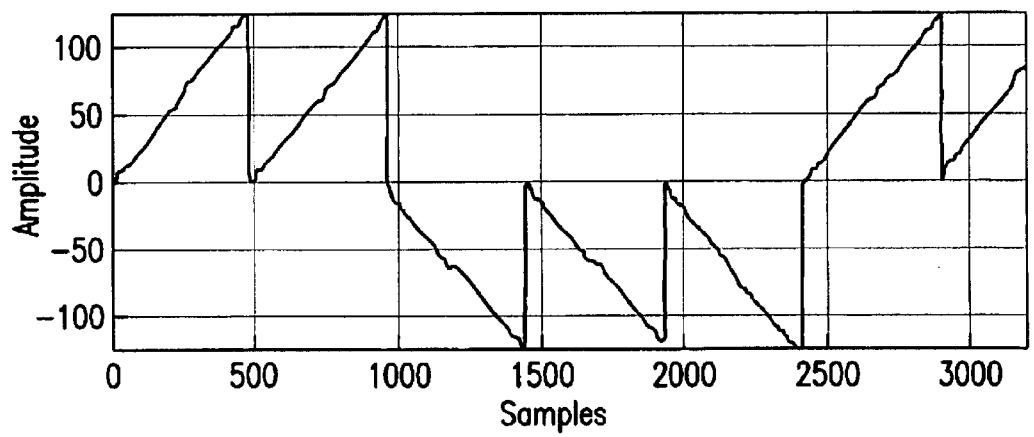
Figure 21A:
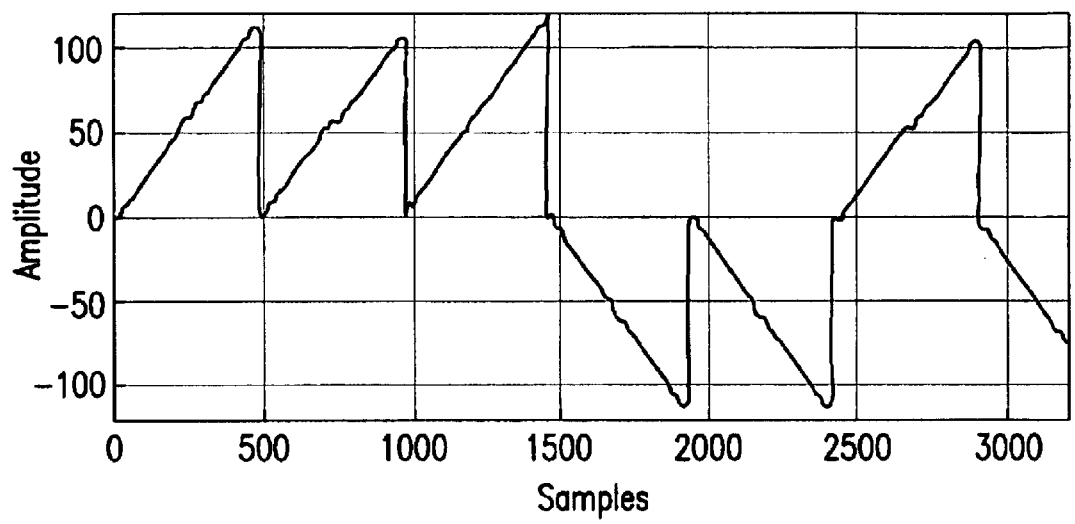
Figure 21B:
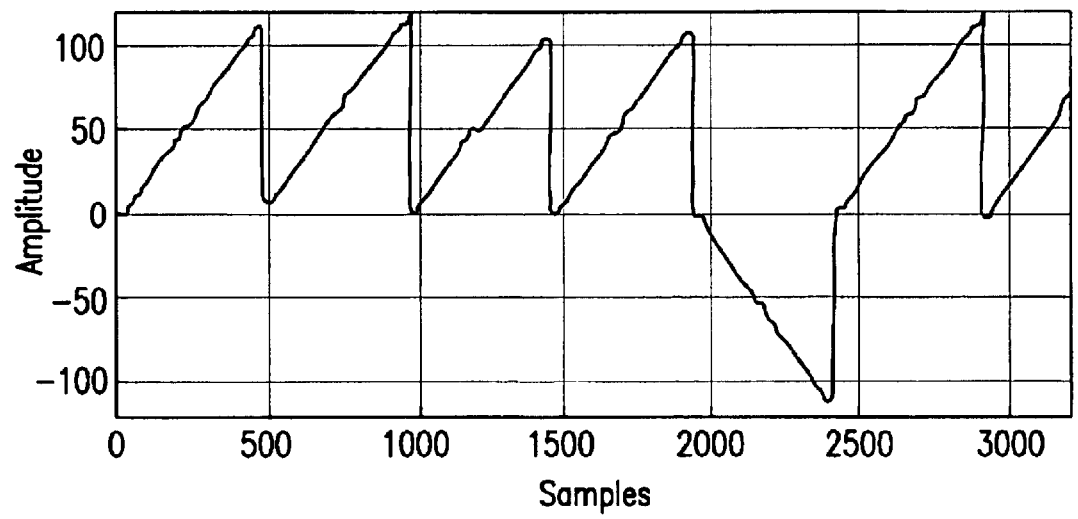

The aforementioned high frequency components are eliminated in each branch by integrate-and-dump circuits or filters 84, 86, 88 and 90, to yield signals $g_1(t)$, $g_2(t)$, $g_3(t)$ and $g_4(t)$. Representations of the signals $g_1(t)$ and $g_2(t)$ are shown in FIGS. 20(a) and FIG. 20(b) respectively and representations of signal $g_3(t)$ and $g_4(t)$ are shown in FIG. 21(a) and FIG. 21(b) respectively. The PSD of the signal $g_1(t)$ is shown in FIG. 22, which shows that the high frequency components have been filtered out.

The signals $g_1(t)$, $g_2(t)$, $g_3(t)$ and $g_4(t)$ are then sampled and held by sample-and-hold circuits 92, 94, 96 and 98. Decisions are then made on these four sampled signals to recover the data streams in d(t) signal in the form of $\hat{d}_1$, $\hat{d}_2$, $\hat{d}_3$ and $\hat{d}_4$.

To be able to recover the quadrature carriers which are needed for the aforementioned demodulation process at 70, 72, 74 and 76, the branch signals are cross multiplied and summed as illustrated in the output stages of FIG. 3, to produce the aforementioned first error signal $e_1(t)$ to drive voltage controlled oscillator (VCO) 100, which provides the carrier (cos $\omega_c t$) at output 58 thereof.

Referring now more particularly to FIG. 4, the incoming signal r(t) is despreaded by multipliers 102 and 104 by means of two difference despreading sequences $C_1 \Delta$ and $C_2 \Delta$ which are equal to the difference between a late and an early replica of the combination spreading sequences $C_1$ and $C_2$ respectively, used at the modulator. The despreaded signals are split into in-phase and quadrature branches and are demodulated with the recovered cosine and sine carriers at multipliers 106, 108, 110 and 112. High frequency components are removed by integrate-and-dump circuits 114, 116, 118 and 120 after which the signals are sampled and held at 122, 124, 126 and 128. The four branch signals are then remodulated at multipliers 130, 132, 134 and 136 by the four decisions made by the DDCCCRL 50, to remove the data modulation on each of the branch signals. The four branch signals are then summed at adders 138, 140 and 82 and filtered by the loop filter 142, to form the aforementioned second error signal $e_2(t)$, to control the voltage controlled despreading sequence generator 62. The generator 62 produces the combination despreading sequences $C_1$ and $C_2$ as well as the aforementioned difference despreading sequences $C_1 \Delta$ and $C_2 \Delta$. The error signal $e_2(t)$ is a representation of the timing error between the spreading sequences tracked in the received signal r(t) and the locally generated despreading sequences.

In FIG. 23 there is shown a comparison of bit error rate (BER) of a simulation of the modem according to the invention in an additive white Gaussian noise (AWGN) channel and the theoretical values for a bipolar phase shift keying spread spectrum (BPSK-SS) system. It is clear from the graph that the BER for the modem according to the invention is comparable with that of BPSK and QPSK, at four times the data rate of BPSK and twice that of QPSK, for a given bandwidth.

For a four-dimensional modem the two combinations $C_1$ and $C_2$ of only one complex sequence $C_a$ are needed as spreading sequence. The dimensions of the modem can be increased as aforesaid, for example by adding other suitable combination sequences and/or adding other complex sequences $C_b$, $C_c$ . . . Such a structure is shown in FIG. 24, where elements corresponding to elements in FIG. 1 are indicated by like reference numerals. The n-dimensional modem of FIG. 24 requires n/2 spreading sequences ($C_1$ . . . $C_{n/2}$) which may be obtained by combinations of the real and imaginary parts of not more than n/4 complex sequences $C_a$, $C_b$ . . . and utilizing the quadrature carriers to increase the dimensions of the modulator to n.

The main reason of selecting the unique combination spreading sequences $C_1$ and $C_2$ is that the full advantages of the correlation properties of complex sequences are exploited at the demodulator. By using these combinations, all the parts, real and imaginary, of the complex sequences contribute to the auto correlation performed at the demodulator. This gives the system an advantage of about 6 dB in terms of the detection of correlation peaks in the recovering of data, on each branch of the demodulator. The full advantages of the correlation properties of complex sequences are also utilized in the DDCDLL 52.

The components of the demodulator 12, especially the DDCDLL 52 and DDCCCRL 50, are designed to eliminate all unwanted cross terms generated as a result of using the aforementioned combinations.

Furthermore, by utilizing root-of-unity filtered complex sequences with analytical properties as hereinbefore described, a constant envelope, single side-band signal s(t) may be obtained at the modulator. FIG. 26 illustrates a single side-band modulator 150 wherein spreading sequences $C_1$ and $C_2$, both with analytical properties are utilized. The input data signals $d_{1(t)}$ and $d_{2(t)}$ are duplicated at the spreading multipliers 152 and 154. The signal s(t) is a single side-band signal, but due to the aforementioned duplication, the data throughput of the modulator 150 is half that of the modulator 10.

One application of the modem according to the invention is multiple-access communications where a number of independent users are required to share a common channel, without an external synchronizing mechanism. Every user has his own spreading sequence $C_1, C_2, C_3 \ldots$ and shares the same bandwidth. The unique properties of the sequences make it possible to recover each transmission from the composite spectrum at the demodulator. Thus, the system provides a form of secure communication in a hostile environment such that the transmitter signal originating from one user is not easily detected or recognized by unauthorized listeners.

A particular application could be in a wireless local loop (WLL) to replace the existing wired PABX's. This would add a mobile dimension to the traditionally "fixed" PABX systems.

It is believed that the modem according to the invention could be used in multi-media applications, where one branch of the modulator is used for raw data, another for data relating to digital audio signals and the other two for data relating to digitized visible images.

It will be appreciated that there are many variations available on the modem, modulator, demodulator and method according to the invention, without departing from the scope and spirit of the appended claims.

TABLE 1

| Sample # | Cr | Ci | Cr − Ci | −Cr − Ci |
|---|---|---|---|---|
| 1 | 1 | 0 | 1 | −1 |
| 2 | 0.999916 | −0.01298 | 1.012897 | −0.986934 |
| 3 | 0.999663 | −0.02596 | 1.025624 | −0.973702 |
| 4 | 0.999242 | −0.03894 | 1.038177 | −0.960306 |
| 5 | 0.998652 | −0.0519 | 1.050556 | −0.946748 |
| 6 | 0.996968 | −0.07781 | 1.07478 | −0.919156 |
| 7 | 0.994612 | −0.103668 | 1.09828 | −0.890944 |
| 8 | 0.991585 | −0.129454 | 1.121039 | −0.862132 |
| 9 | 0.987891 | −0.155152 | 1.143043 | −0.832738 |
| 10 | 0.981101 | −0.193499 | 1.174599 | −0.787602 |
| 11 | 0.972823 | −0.231551 | 1.204374 | −0.741271 |
| 12 | 0.963069 | −0.269253 | 1.232323 | −0.693816 |
| 13 | 0.951856 | −0.306547 | 1.258402 | −0.645309 |
| 14 | 0.934662 | −0.355538 | 1.2902 | −0.579123 |
| 15 | 0.914948 | −0.403572 | 1.31852 | −0.511376 |
| 16 | 0.892768 | −0.450517 | 1.343285 | −0.442251 |
| 17 | 0.868181 | −0.496248 | 1.364429 | −0.371933 |
| 18 | 0.834164 | −0.551516 | 1.38568 | −0.282648 |
| 19 | 0.796635 | −0.604461 | 1.401096 | −0.192173 |
| 20 | 0.75575 | −0.654861 | 1.41061 | −0.100889 |
| 21 | 0.711682 | −0.702502 | 1.414184 | −0.0092 |
| 22 | 0.654861 | −0.75575 | 1.41061 | 0.100889 |
| 23 | 0.594069 | −0.804414 | 1.398483 | 0.210345 |
| 24 | 0.529675 | −0.848201 | 1.377876 | 0.318526 |
| 25 | 0.462068 | −0.886844 | 1.348913 | 0.424776 |
| 26 | 0.379683 | −0.925117 | 1.3048 | 0.545434 |
| 27 | 0.294164 | −0.955755 | 1.249919 | 0.66159 |
| 28 | 0.206218 | −0.978506 | 1.184724 | 0.772288 |
| 29 | 0.11657 | −0.993182 | 1.109753 | 0.876612 |
| 30 | 0.012981 | −0.999916 | 1.012897 | 0.986934 |
| 31 | −0.09075 | −0.995874 | 0.905126 | 1.086621 |
| 32 | −0.193499 | −0.981101 | 0.787602 | 1.174599 |
| 33 | −0.294164 | −0.955755 | 0.66159 | 1.249919 |
| 34 | −0.403572 | −0.914948 | 0.511376 | 1.31852 |
| 35 | −0.507476 | −0.861666 | 0.35419 | 1.369142 |
| 36 | −0.604461 | −0.796635 | 0.192173 | 0.401096 |
| 37 | −0.693204 | −0.720741 | 0.027537 | 1.413945 |
| 38 | −0.780674 | −0.624939 | −0.155735 | 1.405613 |
| 39 | −0.855005 | −0.518619 | −0.336386 | 1.373624 |
| 40 | −0.914948 | −0.403572 | −0.511376 | 1.31852 |

TABLE 1-continued

| Sample # | Cr | Ci | Cr − Ci | −Cr − Ci |
|---|---|---|---|---|
| 41 | −0.959493 | −0.281733 | −0.67776 | 1.241226 |
| 42 | −0.989821 | −0.142315 | −0.847507 | 1.132136 |
| 43 | −1 | 0 | −1 | 1 |
| 44 | −0.989821 | 0.142315 | −1.132136 | 0.847507 |
| 45 | −0.959493 | 0.281733 | −1.241226 | 0.67776 |
| 46 | −0.904163 | 0.427188 | −1.331351 | 0.476974 |
| 47 | −0.826935 | 0.562298 | −1.389233 | 0.264637 |
| 48 | −0.729679 | 0.68379 | −1.413469 | 0.045889 |
| 49 | −0.614752 | 0.788721 | −1.403472 | −0.173969 |
| 50 | −0.473542 | 0.880771 | −1.354313 | −0.407229 |
| 51 | −0.318877 | 0.947796 | −1.266673 | −0.628919 |
| 52 | −0.155152 | 0.987891 | −1.143043 | −0.832738 |
| 53 | 0.012981 | 0.999916 | −0.986934 | −1.012897 |
| 54 | 0.193499 | 0.981101 | −0.787602 | −1.174599 |
| 55 | 0.367642 | 0.929968 | −0.562326 | −1.297609 |
| 56 | 0.529675 | 0.848201 | −0.318526 | −1.377876 |
| 57 | 0.67426 | 0.738494 | −0.06423 | −1.412754 |
| 58 | 0.804414 | 0.594069 | 0.210345 | −1.398483 |
| 59 | 0.904163 | 0.427188 | 0.476974 | −1.331351 |
| 60 | 0.969735 | 0.244161 | 0.725574 | −1.213895 |
| 61 | 0.998652 | 0.051904 | 0.946748 | −1.050556 |
| 62 | 0.987891 | −0.155152 | 1.143043 | −0.832738 |
| 63 | 0.934662 | −0.355538 | 1.2902 | −0.579123 |
| 64 | 0.841254 | −0.540641 | 1.381894 | −0.300613 |
| 65 | 0.711682 | −0.702502 | 1.414184 | −0.0092 |
| 66 | 0.540641 | −0.841254 | 1.381894 | 0.300613 |
| 67 | 0.343375 | −0.939198 | 1.282574 | 0.595823 |
| 68 | 0.129454 | −0.991585 | 1.121039 | 0.862132 |
| 69 | −0.09075 | −0.995874 | 0.905126 | 1.086621 |
| 70 | −0.318877 | −0.947796 | 0.628919 | 1.266673 |
| 71 | −0.529675 | −0.848201 | 0.318526 | 1.377876 |
| 72 | −0.711682 | −0.702502 | −0.0092 | 1.414184 |
| 73 | −0.855005 | −0.518619 | −0.336386 | 1.373624 |
| 74 | −0.955755 | −0.294164 | −0.66159 | 1.249919 |
| 75 | −0.998652 | −0.0519 | −0.946748 | 1.050556 |
| 76 | −0.981101 | 0.193499 | −1.174599 | 0.787602 |
| 77 | −0.904163 | 0.427188 | −1.331351 | 0.476974 |
| 78 | −0.764187 | 0.644995 | −1.409182 | 0.119192 |
| 79 | −0.572986 | 0.819566 | −1.392551 | −0.24658 |
| 80 | −0.343375 | 0.939198 | −1.282574 | −0.595823 |
| 81 | −0.09075 | 0.995874 | −1.086621 | −0.905126 |
| 82 | 0.180746 | 0.98353 | −0.802784 | −1.164276 |
| 83 | 0.43889 | 0.898541 | −0.459651 | −1.337431 |
| 84 | 0.664616 | 0.747185 | −0.08257 | −1.411801 |
| 85 | 0.841254 | 0.540641 | 0.300613 | −1.381894 |
| 86 | 0.959493 | 0.281733 | 0.67776 | −1.241226 |
| 87 | 1 | 0 | 1 | −1 |
| 88 | 0.959493 | −0.281733 | 1.241226 | −0.67776 |
| 89 | 0.841254 | −0.540641 | 1.381894 | −0.300613 |
| 90 | 0.644995 | −0.764187 | 1.409182 | 0.119192 |
| 91 | 0.39166 | −0.92011 | 1.31177 | 0.52845 |
| 92 | 0.103668 | −0.994612 | 1.09828 | 0.890944 |
| 93 | −0.193499 | −0.981101 | 0.787602 | 1.174599 |
| 94 | −0.484936 | −0.87455 | 0.389614 | 1.359486 |
| 95 | −0.729679 | −0.68379 | −0.04589 | 1.413469 |
| 96 | −0.904163 | −0.427188 | −0.476974 | 1.331351 |
| 97 | −0.991585 | −0.129454 | −0.862132 | 1.121039 |
| 98 | −0.981101 | 0.193499 | −1.174599 | 0.787602 |
| 99 | −0.868181 | 0.496248 | −1.364429 | 0.371933 |
| 100 | −0.664616 | 0.747185 | −1.411801 | −0.08257 |
| 101 | −0.39166 | 0.92011 | −1.31177 | −0.52845 |
| 102 | −0.06486 | 0.997894 | −1.062758 | −0.933031 |
| 103 | 0.269253 | 0.963069 | −0.693816 | −1.232323 |
| 104 | 0.572986 | 0.819566 | −0.24658 | −1.392551 |
| 105 | 0.812058 | 0.583576 | 0.228482 | −1.395635 |
| 106 | 0.963069 | 0.269253 | 0.693816 | −1.232323 |
| 107 | 0.996968 | −0.07781 | 1.07478 | −0.919156 |
| 108 | 0.909632 | −0.415415 | 1.325047 | −0.494217 |
| 109 | 0.711682 | −0.702502 | 1.414184 | −0.0092 |
| 110 | 0.415415 | −0.909632 | 1.325047 | 0.494217 |
| 111 | 0.064863 | −0.997894 | 1.062758 | 0.933031 |
| 112 | −0.294164 | −0.955755 | 0.66159 | 1.249919 |
| 113 | −0.614752 | −0.788721 | 0.173969 | 1.403472 |
| 114 | −0.861666 | −0.507476 | −0.35419 | 1.369142 |
| 115 | −0.987891 | −0.155152 | −0.832738 | 1.143043 |
| 116 | −0.975747 | 0.218903 | −1.19465 | 0.756843 |
| 117 | −0.826935 | 0.562298 | −1.389233 | 0.264637 |

TABLE 1-continued

| Sample # | Cr | Ci | Cr − Ci | −Cr − Ci |
|---|---|---|---|---|
| 118 | −0.551516 | 0.834164 | −1.38568 | −0.282648 |
| 119 | −0.193499 | 0.981101 | −1.174599 | −0.787602 |
| 120 | 0.193499 | 0.981101 | −0.787602 | −1.174599 |
| 121 | 0.551516 | 0.834164 | −0.282648 | −1.38568 |
| 122 | 0.834164 | 0.551516 | 0.282648 | −1.38568 |
| 123 | 0.98353 | 0.180746 | 0.802784 | −1.164276 |
| 124 | 0.975747 | −0.218903 | 1.19465 | −0.756843 |
| 125 | 0.812058 | −0.583576 | 1.395635 | −0.228482 |
| 126 | 0.507476 | −0.861666 | 1.369142 | 0.35419 |
| 127 | 0.11657 | −0.993182 | 1.109753 | 0.876612 |
| 128 | −0.294164 | −0.955755 | 0.66159 | 1.249919 |
| 129 | −0.654861 | −0.75575 | 0.100889 | 1.41061 |
| 130 | −0.909632 | −0.415415 | −0.494217 | 1.325047 |
| 131 | −1 | 0 | −1 | 1 |
| 132 | −0.909632 | 0.415415 | −1.325047 | 0.494217 |
| 133 | −0.654861 | 0.75575 | −1.41061 | −0.100889 |
| 134 | −0.269253 | 0.963069 | −1.232323 | −0.693816 |
| 135 | 0.167963 | 0.985793 | −0.81783 | −1.153757 |
| 136 | 0.572986 | 0.819566 | −0.24658 | −1.392551 |
| 137 | 0.868181 | 0.496248 | 0.371933 | −1.364429 |
| 138 | 0.997894 | 0.064863 | 0.933031 | −1.062758 |
| 139 | 0.925117 | −0.379683 | 1.3048 | −0.545434 |
| 140 | 0.664616 | −0.747185 | 1.411801 | 0.082569 |
| 141 | 0.269253 | −0.963069 | 1.232323 | 0.693816 |
| 142 | −0.193499 | −0.981101 | 0.787602 | 1.174599 |
| 143 | −0.614752 | −0.788721 | 0.173969 | 1.403472 |
| 144 | −0.904163 | −0.427188 | −0.476974 | 1.331351 |
| 145 | −0.999663 | 0.025961 | −1.025624 | 0.973702 |
| 146 | −0.87455 | 0.484936 | −1.359486 | 0.389614 |
| 147 | −0.551516 | 0.834164 | −1.38568 | −0.282648 |
| 148 | −0.103668 | 0.994612 | −1.09828 | −0.890944 |
| 149 | 0.367642 | 0.929968 | −0.562326 | −1.297609 |
| 150 | 0.764187 | 0.644995 | 0.119192 | −1.409182 |
| 151 | 0.978506 | 0.206218 | 0.772288 | −1.184724 |
| 152 | 0.959493 | −0.281733 | 1.241226 | −0.67776 |
| 153 | 0.711682 | −0.702502 | 1.414184 | −0.0092 |
| 154 | 0.281733 | −0.959493 | 1.241226 | 0.67776 |
| 155 | −0.218903 | −0.975747 | 0.756843 | 1.19465 |
| 156 | −0.664616 | −0.747185 | 0.082569 | 1.411801 |
| 157 | −0.943577 | −0.331154 | −0.612423 | 1.274731 |
| 158 | −0.98353 | 0.180746 | −1.164276 | 0.802784 |
| 159 | −0.764187 | 0.644995 | −1.409182 | 0.119192 |
| 160 | −0.343375 | 0.939198 | −1.282574 | −0.595823 |
| 161 | 0.167963 | 0.985793 | −0.81783 | −1.153757 |
| 162 | 0.644995 | 0.764187 | −0.119192 | −1.409182 |
| 163 | 0.943577 | 0.331154 | 0.612423 | −1.274731 |
| 164 | 0.981101 | −0.193499 | 1.174599 | −0.787602 |
| 165 | 0.747185 | −0.664616 | 1.411801 | −0.08257 |
| 166 | 0.294164 | −0.955755 | 1.249919 | 0.66159 |
| 167 | −0.244161 | −0.969735 | 0.725574 | 1.213895 |
| 168 | −0.711682 | −0.702502 | −0.0092 | 1.414184 |
| 169 | −0.972823 | −0.231551 | −0.741271 | 1.204374 |
| 170 | −0.947796 | 0.318877 | −1.266673 | 0.628919 |
| 171 | −0.63502 | 0.772495 | −1.407516 | −0.137475 |
| 172 | −0.129454 | 0.991585 | −1.121039 | −0.862132 |
| 173 | 0.415415 | 0.909632 | −0.494217 | −1.325047 |
| 174 | 0.841254 | 0.540641 | 0.300613 | −1.381894 |
| 175 | 1 | 0 | 1 | −1 |
| 176 | 0.841254 | −0.540641 | 1.381894 | −0.300613 |
| 177 | 0.415415 | −0.909632 | 1.325047 | 0.494217 |
| 178 | −0.155152 | −0.987891 | 0.832738 | 1.143043 |
| 179 | −0.67426 | −0.738494 | 0.064234 | 1.412754 |
| 180 | −0.969735 | −0.244161 | −0.725574 | 1.213895 |
| 181 | −0.943577 | 0.331154 | −1.274731 | 0.612423 |
| 182 | −0.594069 | 0.804414 | −1.398483 | −0.210345 |
| 183 | −0.03894 | 0.999242 | −1.038177 | −0.960306 |
| 184 | 0.529675 | 0.848201 | −0.318526 | −1.377876 |
| 185 | 0.914948 | 0.403572 | 0.511376 | −1.31852 |
| 186 | 0.981101 | −0.193499 | 1.174599 | −0.787602 |
| 187 | 0.693204 | −0.720741 | 1.413945 | 0.027537 |
| 188 | 0.155152 | −0.987891 | 1.143043 | 0.832738 |
| 189 | −0.43889 | −0.898541 | 0.459651 | 1.337431 |
| 190 | −0.880771 | −0.473542 | −0.407229 | 1.354313 |
| 191 | −0.991585 | 0.129454 | −1.121039 | 0.862132 |
| 192 | −0.729679 | 0.68379 | −1.413469 | 0.045889 |
| 193 | −0.193499 | 0.981101 | −1.174599 | −0.787602 |
| 194 | 0.427188 | 0.904163 | −0.476974 | −1.331351 |
| 195 | 0.880771 | 0.473542 | 0.407229 | −1.354313 |
| 196 | 0.989821 | −0.142315 | 1.132136 | −0.847507 |
| 197 | 0.711682 | −0.702502 | 1.414184 | −0.0092 |
| 198 | 0.142315 | −0.989821 | 1.132136 | 0.847507 |
| 199 | −0.484936 | −0.87455 | 0.389614 | 1.359486 |
| 200 | −0.914948 | −0.403572 | −0.511376 | 1.31852 |
| 201 | −0.972823 | 0.231551 | −1.204374 | 0.741271 |
| 202 | −0.624939 | 0.780674 | −1.405613 | −0.155735 |
| 203 | −0.01298 | 0.999916 | −1.012897 | −0.986934 |
| 204 | 0.604461 | 0.796635 | −0.192173 | −1.401096 |
| 205 | 0.966484 | 0.256729 | 0.709755 | −1.223212 |
| 206 | 0.914948 | −0.403572 | 1.31852 | −0.511376 |
| 207 | 0.462068 | −0.886844 | 1.348913 | 0.424776 |
| 208 | −0.193499 | −0.981101 | 0.787602 | 1.174599 |
| 209 | −0.764187 | −0.644995 | −0.119192 | 1.409182 |
| 210 | −0.999916 | −0.01298 | −0.986934 | 1.012897 |
| 211 | −0.780674 | 0.624939 | −1.405613 | 0.155735 |
| 212 | −0.206218 | 0.978506 | −1.184724 | −0.772288 |
| 213 | 0.462068 | 0.886844 | −0.424776 | −1.348913 |
| 214 | 0.925117 | 0.379683 | 0.545434 | −1.3048 |
| 215 | 0.951856 | −0.306547 | 1.258402 | −0.645309 |
| 216 | 0.529675 | −0.848201 | 1.377876 | 0.318526 |
| 217 | −0.142315 | −0.989821 | 0.847507 | 1.132136 |
| 218 | −0.75575 | −0.654861 | −0.100889 | 1.41061 |
| 219 | −1 | 0 | −1 | 1 |
| 220 | −0.75575 | 0.654861 | −1.41061 | 0.100889 |
| 221 | −0.142315 | 0.989821 | −1.132136 | −0.847507 |
| 222 | 0.551516 | 0.834164 | −0.282648 | −1.38568 |
| 223 | 0.966484 | 0.256729 | 0.709755 | −1.223212 |
| 224 | 0.892768 | −0.450517 | 1.343285 | −0.442251 |
| 225 | 0.367642 | −0.929968 | 1.297609 | 0.562326 |
| 226 | −0.355538 | −0.934662 | 0.579123 | 1.2902 |
| 227 | −0.892768 | −0.450517 | −0.442251 | 1.343285 |
| 228 | −0.963069 | 0.269253 | −1.232323 | 0.693816 |
| 229 | −0.529675 | 0.848201 | −1.377876 | −0.318526 |
| 230 | 0.193499 | 0.981101 | −0.787602 | −1.174599 |
| 231 | 0.812058 | 0.583576 | 0.228482 | −1.395635 |
| 232 | 0.991585 | −0.129454 | 1.121039 | −0.862132 |
| 233 | 0.63502 | −0.772495 | 1.407516 | 0.137475 |
| 234 | −0.07781 | −0.996968 | 0.919156 | 1.07478 |
| 235 | −0.747185 | −0.664616 | −0.08257 | 1.411801 |
| 236 | −0.999242 | 0.038936 | −1.038177 | 0.960306 |
| 237 | −0.693204 | 0.720741 | −1.413945 | −0.02754 |
| 238 | 0.012981 | 0.999916 | −0.986934 | −1.012897 |
| 239 | 0.711682 | 0.702502 | 0.00918 | −1.414184 |
| 240 | 1 | 0 | 1 | −1 |
| 241 | 0.711682 | −0.702502 | 1.414184 | −0.0092 |
| 242 | 1 | 0 | 1 | −1 |
| 243 | 0.711682 | 0.702502 | 0.00918 | −1.414184 |
| 244 | 0.012981 | 0.999916 | −0.986934 | −1.012897 |
| 245 | −0.693204 | 0.720741 | −1.413945 | −0.02754 |
| 246 | −0.999242 | 0.038936 | −1.038177 | 0.960306 |
| 247 | −0.747185 | −0.664616 | −0.08257 | 1.411801 |
| 248 | −0.07781 | −0.996968 | 0.919156 | 1.07478 |
| 249 | 0.63502 | −0.772495 | 1.407516 | 0.137475 |
| 250 | 0.991585 | −0.129454 | 1.121039 | −0.862132 |
| 251 | 0.812058 | 0.583576 | 0.228482 | −1.395635 |
| 252 | 0.193499 | 0.981101 | −0.787602 | −1.174599 |
| 253 | −0.529675 | 0.848201 | −1.377876 | −0.318526 |
| 254 | −0.963069 | 0.269253 | −1.232323 | 0.693816 |
| 255 | −0.892768 | −0.450517 | −0.442251 | 1.343285 |
| 256 | −0.355538 | −0.934662 | 0.579123 | 1.2902 |
| 257 | 0.367642 | −0.929968 | 1.297609 | 0.562326 |
| 258 | 0.892768 | −0.450517 | 1.343285 | −0.442251 |
| 259 | 0.966484 | 0.256729 | 0.709755 | −1.223212 |
| 260 | 0.551516 | 0.834164 | −0.282648 | −1.38568 |
| 261 | −0.142315 | 0.989821 | −1.132136 | −0.847507 |
| 262 | −0.75575 | 0.654861 | −1.41061 | 0.100889 |
| 263 | −1 | 0 | −1 | 1 |
| 264 | −0.75575 | −0.654861 | −0.100889 | 1.41061 |
| 265 | −0.142315 | −0.989821 | 0.847507 | 1.132136 |
| 266 | 0.529675 | −0.848201 | 1.377876 | 0.318526 |
| 267 | 0.951856 | −0.306547 | 1.258402 | −0.645309 |
| 268 | 0.925117 | 0.379683 | 0.545434 | −1.3048 |
| 269 | 0.462068 | 0.886844 | −0.424776 | −1.348913 |
| 270 | −0.206218 | 0.978506 | −1.184724 | −0.772288 |
| 271 | −0.780674 | 0.624939 | −1.405613 | 0.155735 |

TABLE 1-continued

| Sample # | Cr | Ci | Cr − Ci | −Cr − Ci |
|---|---|---|---|---|
| 272 | −0.999916 | −0.01298 | −0.986934 | 1.012897 |
| 273 | −0.764187 | −0.644995 | −0.119192 | 1.409182 |
| 274 | −0.193499 | −0.981101 | 0.787602 | 1.174599 |
| 275 | 0.462068 | −0.886844 | 1.348913 | 0.424776 |
| 276 | 0.914948 | −0.403572 | 1.31852 | −0.511376 |
| 277 | 0.966484 | 0.256729 | 0.709755 | −1.223212 |
| 278 | 0.604461 | 0.796635 | −0.192173 | −1.401096 |
| 279 | −0.01298 | 0.999916 | −1.012897 | −0.986934 |
| 280 | −0.624939 | 0.780674 | −1.405613 | −0.155735 |
| 281 | −0.972823 | 0.231551 | −1.204374 | 0.741271 |
| 282 | −0.914948 | −0.403572 | −0.511376 | 1.31852 |
| 283 | −0.484936 | −0.87455 | 0.389614 | 1.359486 |
| 284 | 0.142315 | −0.989821 | 1.132136 | 0.847507 |
| 285 | 0.711682 | −0.702502 | 1.414184 | −0.0092 |
| 286 | 0.989821 | −0.142315 | 1.132136 | −0.847507 |
| 287 | 0.880771 | 0.473542 | 0.407229 | −1.354313 |
| 288 | 0.427188 | 0.904163 | −0.476974 | −1.331351 |
| 289 | −0.193499 | 0.981101 | −1.174599 | −0.787602 |
| 290 | −0.729679 | 0.68379 | −1.413469 | 0.045889 |
| 291 | −0.991585 | 0.129454 | −1.121039 | 0.862132 |
| 292 | −0.880771 | −0.473542 | −0.407229 | 1.354313 |
| 293 | −0.43889 | −0.898541 | 0.459651 | 1.337431 |
| 294 | 0.155152 | −0.987891 | 1.143043 | 0.832738 |
| 295 | 0.693204 | −0.720741 | 1.413945 | 0.027537 |
| 296 | 0.981101 | −0.193499 | 1.174599 | −0.787602 |
| 297 | 0.914948 | 0.403572 | 0.511376 | −1.31852 |
| 298 | 0.529675 | 0.848201 | −0.318526 | −1.377876 |
| 299 | −0.03894 | 0.999242 | −1.038177 | −0.960306 |
| 300 | −0.594069 | 0.804414 | −1.398483 | −0.210345 |
| 301 | −0.943577 | 0.331154 | −1.274731 | 0.612423 |
| 302 | −0.969735 | −0.244161 | −0.725574 | 1.213895 |
| 303 | −0.67426 | −0.738494 | 0.064234 | 1.412754 |
| 304 | −0.155152 | −0.987891 | 0.832738 | 1.143043 |
| 305 | 0.415415 | −0.909632 | 1.325047 | 0.494217 |
| 306 | 0.841254 | −0.540641 | 1.381894 | −0.300613 |
| 307 | 1 | 0 | 1 | −1 |
| 308 | 0.841254 | 0.540641 | 0.300613 | −1.381894 |
| 309 | 0.415415 | 0.909632 | −0.494217 | −1.325047 |
| 310 | −0.129454 | 0.991585 | −1.121039 | −0.862132 |
| 311 | −0.63502 | 0.772495 | −1.407516 | −0.137475 |
| 312 | −0.947796 | 0.318877 | −1.266673 | 0.628919 |
| 313 | −0.972823 | −0.231551 | −0.741271 | 1.204374 |
| 314 | −0.711682 | −0.702502 | −0.0092 | 1.414184 |
| 315 | −0.244161 | −0.969735 | 0.725574 | 1.213895 |
| 316 | 0.294164 | −0.955755 | 1.249919 | 0.66159 |
| 317 | 0.747185 | −0.664616 | 1.411801 | −0.08257 |
| 318 | 0.981101 | −0.193499 | 1.174599 | −0.787602 |
| 319 | 0.943577 | 0.331154 | 0.612423 | −1.274731 |
| 320 | 0.644995 | 0.764187 | −0.119192 | −1.409182 |
| 321 | 0.167963 | 0.985793 | −0.81783 | −1.153757 |
| 322 | −0.343375 | 0.939198 | −1.282574 | −0.595823 |
| 323 | −0.764187 | 0.644995 | −1.409182 | 0.119192 |
| 324 | −0.98353 | 0.180746 | −1.164276 | 0.802784 |
| 325 | −0.943577 | −0.331154 | −0.612423 | 1.274731 |
| 326 | −0.664616 | −0.747185 | 0.082569 | 1.411801 |
| 327 | −0.218903 | −0.975747 | 0.756843 | 1.19465 |
| 328 | 0.281733 | −0.959493 | 1.241226 | 0.67776 |
| 329 | 0.711682 | −0.702502 | 1.414184 | −0.0092 |
| 330 | 0.959493 | −0.281733 | 1.241226 | −0.67776 |
| 331 | 0.978506 | 0.206218 | 0.772288 | −1.184724 |
| 332 | 0.764187 | 0.644995 | 0.119192 | −1.409182 |
| 333 | 0.367642 | 0.929968 | −0.562326 | −1.297609 |
| 334 | −0.103668 | 0.994612 | −1.09828 | −0.890944 |
| 335 | −0.551516 | 0.834164 | −1.38568 | −0.282648 |
| 336 | −0.87455 | 0.484936 | −1.359486 | 0.389614 |
| 337 | −0.999663 | 0.025961 | −1.025624 | 0.973702 |
| 338 | −0.904163 | −0.427188 | −0.476974 | 1.331351 |
| 339 | −0.614752 | −0.788721 | 0.173969 | 1.403472 |
| 340 | −0.193499 | −0.981101 | 0.787602 | 1.174599 |
| 341 | 0.269253 | −0.963069 | 1.232323 | 0.693816 |
| 342 | 0.664616 | −0.747185 | 1.411801 | 0.082569 |
| 343 | 0.925117 | −0.379683 | 1.3048 | −0.545434 |
| 344 | 0.997894 | 0.064863 | 0.933031 | −1.062758 |
| 345 | 0.868181 | 0.496248 | 0.371933 | −1.364429 |
| 346 | 0.572986 | 0.819566 | −0.24658 | −1.392551 |
| 347 | 0.167963 | 0.985793 | −0.81783 | −1.153757 |
| 348 | −0.269253 | 0.963069 | −1.232323 | −0.693816 |
| 349 | −0.654861 | 0.75575 | −1.41061 | −9.100889 |
| 350 | −0.909632 | 0.415415 | −1.325047 | 0.494217 |
| 351 | −1 | 0 | −1 | 1 |
| 352 | −0.909632 | −0.415415 | −0.494217 | 1.325047 |
| 353 | −0.654861 | −0.75575 | 0.100889 | 1.41061 |
| 354 | −0.294164 | −0.955755 | 0.66159 | 1.249919 |
| 355 | 0.11657 | −0.993182 | 1.109753 | 0.876612 |
| 356 | 0.507476 | −0.861666 | 1.369142 | 0.35419 |
| 357 | 0.812058 | −0.583576 | 1.395635 | −0.228482 |
| 358 | 0.975747 | −0.218903 | 1.19465 | −0.756843 |
| 359 | 0.98353 | 0.180746 | 0.802784 | −1.164276 |
| 360 | 0.834164 | 0.551516 | 0.282648 | −1.38568 |
| 361 | 0.551516 | 0.834164 | −0.282648 | −1.38568 |
| 362 | 0.193499 | 0.981101 | −0.787602 | −1.174599 |
| 363 | −0.193499 | 0.981101 | −1.174599 | −0.787602 |
| 364 | −0.551516 | 0.834164 | −1.38568 | −0.282648 |
| 365 | −0.826935 | 0.562298 | −1.389233 | 0.264637 |
| 366 | −0.975747 | 0.218903 | −1.19465 | 0.756843 |
| 367 | −0.987891 | −0.155152 | −0.832738 | 1.143043 |
| 368 | −0.861666 | −0.507476 | −0.35419 | 1.369142 |
| 369 | −0.614752 | −0.788721 | 0.173969 | 1.403472 |
| 370 | −0.294164 | −0.955755 | 0.66159 | 1.249919 |
| 371 | 0.064863 | −0.997894 | 1.062758 | 0.933031 |
| 372 | 0.415415 | −0.909632 | 1.325047 | 0.494217 |
| 373 | 0.711682 | −0.702502 | 1.414184 | −0.0092 |
| 374 | 0.909632 | −0.415415 | 1.325047 | −0.494217 |
| 375 | 0.996968 | −0.07781 | 1.07478 | −0.919156 |
| 376 | 0.963069 | 0.269253 | 0.693816 | −1.232323 |
| 377 | 0.812058 | 0.583576 | 0.228482 | −1.395635 |
| 378 | 0.572986 | 0.819566 | −0.24658 | −1.392551 |
| 379 | 0.269253 | 0.963069 | −0.693816 | −1.232323 |
| 380 | −0.06486 | 0.997894 | −1.062758 | −0.933031 |
| 381 | −0.39166 | 0.92011 | −1.31177 | −0.52845 |
| 382 | −0.664616 | 0.747185 | −1.411801 | −0.08257 |
| 383 | −0.868181 | 0.496248 | −1.364429 | 0.371933 |
| 384 | −0.981101 | 0.193499 | −1.174599 | 0.787602 |
| 385 | −0.991585 | −0.129454 | −0.862132 | 1.121039 |
| 386 | −0.904163 | −0.427188 | −0.476974 | 1.331351 |
| 387 | −0.729679 | −0.68379 | −0.04589 | 1.413469 |
| 388 | −0.484936 | −0.87455 | 0.389614 | 1.359486 |
| 389 | −0.193499 | −0.981101 | 0.787602 | 1.174599 |
| 390 | 0.103668 | −0.994612 | 1.09828 | 0.890944 |
| 391 | 0.39166 | −0.92011 | 1.31177 | 0.52845 |
| 392 | 0.644995 | −0.764187 | 1.409182 | 0.119192 |
| 393 | 0.841254 | −0.540641 | 1.381894 | −0.300613 |
| 394 | 0.959493 | −0.281733 | 1.241226 | −0.67776 |
| 395 | 1 | 0 | 1 | −1 |
| 396 | 0.959493 | 0.281733 | 0.67776 | −1.241226 |
| 397 | 0.841254 | 0.540641 | 0.300613 | −1.381894 |
| 398 | 0.664616 | 0.747185 | −0.08257 | −1.411801 |
| 399 | 0.43889 | 0.898541 | −0.459651 | −1.337431 |
| 400 | 0.180746 | 0.98353 | −0.802784 | −1.164276 |
| 401 | −0.09075 | 0.995874 | −1.086621 | −0.905126 |
| 402 | −0.343375 | 0.939198 | −1.282574 | −0.595823 |
| 403 | −0.572986 | 0.819566 | −1.392551 | −0.24658 |
| 404 | −0.764187 | 0.644995 | −1.409182 | 0.119192 |
| 405 | −0.904163 | 0.427188 | −1.331351 | 0.476974 |
| 406 | −0.981101 | 0.193499 | −1.174599 | 0.787602 |
| 407 | −0.998652 | −0.0519 | −0.946748 | 1.050556 |
| 408 | −0.955755 | −0.294164 | −0.66159 | 1.249919 |
| 409 | −0.855005 | −0.518619 | −0.336386 | 1.373624 |
| 410 | −0.711682 | −0.702502 | −0.0092 | 1.414184 |
| 411 | −0.529675 | −0.848201 | 0.318526 | 1.377876 |
| 412 | −0.318877 | −0.947796 | 0.628919 | 1.266673 |
| 413 | −0.09075 | −0.995874 | 0.905126 | 1.086621 |
| 414 | 0.129454 | −0.991585 | 1.121039 | 0.862132 |
| 415 | 0.343375 | −0.939198 | 1.282574 | 0.595823 |
| 416 | 0.540641 | −0.841254 | 1.381894 | 0.300613 |
| 417 | 0.711682 | −0.702502 | 1.414184 | −0.0092 |
| 418 | 0.841254 | −0.540641 | 1.381894 | −0.300613 |
| 419 | 0.934662 | −0.355538 | 1.2902 | −0.579123 |
| 420 | 0.987891 | −0.155152 | 1.143043 | −0.832738 |
| 421 | 0.998652 | 0.051904 | 0.946748 | −1.050556 |
| 422 | 0.969735 | 0.244161 | 0.725574 | −1.213895 |
| 423 | 0.904163 | 0.427188 | 0.476974 | −1.331351 |
| 424 | 0.804414 | 0.594069 | 0.210345 | −1.398483 |
| 425 | 0.67426 | 0.738494 | −0.06423 | −1.412754 |

TABLE 1-continued

| Sample # | Cr | Ci | Cr − Ci | −Cr − Ci |
|---|---|---|---|---|
| 426 | 0.529675 | 0.848201 | −0.318526 | −1.377876 |
| 427 | 0.367642 | 0.929968 | −0.562326 | −1.297609 |
| 428 | 0.193499 | 0.981101 | −0.787602 | −1.174599 |
| 429 | 0.012981 | 0.999916 | −0.986934 | −1.012897 |
| 430 | −0.155152 | 0.987891 | −1.143043 | −0.832738 |
| 431 | −0.318877 | 0.947796 | −1.266673 | −0.628919 |
| 432 | −0.473542 | 0.880771 | −1.354313 | −0.407229 |
| 433 | −0.614752 | 0.788721 | −1.403472 | −0.173969 |
| 434 | −0.729679 | 0.68379 | −1.413469 | 0.045889 |
| 435 | −0.826935 | 0.562298 | −1.389233 | 0.264637 |
| 436 | −0.904163 | 0.427188 | −1.331351 | 0.476974 |
| 437 | −0.959493 | 0.281733 | −1.241226 | 0.67776 |
| 438 | −0.989821 | 0.142315 | −1.132136 | 0.847507 |
| 439 | −1 | 0 | −1 | 1 |
| 440 | −0.989821 | −0.142315 | −0.847507 | 1.132136 |
| 441 | −0.959493 | −0.281733 | −0.67776 | 1.241226 |
| 442 | −0.914948 | −0.403572 | −0.511376 | 1.31852 |
| 443 | −0.855005 | −0.518619 | −0.336386 | 1.373624 |
| 444 | −0.780674 | −0.624939 | −0.155735 | 1.405613 |
| 445 | −0.693204 | −0.720741 | 0.027537 | 1.413945 |
| 446 | −0.604461 | −0.796635 | 0.192173 | 1.401096 |
| 447 | −0.507476 | −0.861666 | 0.35419 | 1.369142 |
| 448 | −0.403572 | −0.914948 | 0.511376 | 1.31852 |
| 449 | −0.294164 | −0.955755 | 0.66159 | 1.249919 |
| 450 | −0.193499 | −0.981101 | 0.787602 | 1.174599 |
| 451 | −0.09075 | −0.995874 | 0.905126 | 1.086621 |
| 452 | 0.012981 | −0.999916 | 1.012897 | 0.986934 |
| 453 | 0.11657 | −0.993182 | 1.109753 | 0.876612 |
| 454 | 0.206218 | −0.978506 | 1.184724 | 0.772288 |
| 455 | 0.294164 | −0.955755 | 1.249919 | 0.66159 |
| 456 | 0.379683 | −0.925117 | 1.3048 | 0.545434 |
| 457 | 0.462068 | −0.886844 | 1.348913 | 0.424776 |
| 458 | 0.529675 | −0.848201 | 1.377876 | 0.318526 |
| 459 | 0.594069 | −0.804414 | 1.398483 | 0.210345 |
| 460 | 0.654861 | −0.75575 | 1.41061 | 0.100889 |
| 461 | 0.711682 | −0.702502 | 1.414184 | −0.0092 |
| 462 | 0.75575 | −0.654861 | 1.41061 | −0.100889 |
| 463 | 0.796635 | −0.604461 | 1.401096 | −0.192173 |
| 464 | 0.834164 | −0.551516 | 1.38568 | −0.282648 |
| 465 | 0.868181 | −0.496248 | 1.364429 | −0.371933 |
| 466 | 0.892768 | −0.450517 | 1.343285 | −0.442251 |
| 467 | 0.914948 | −0.403572 | 1.31852 | −0.511376 |
| 468 | 0.934662 | −0.355538 | 1.2902 | −0.579123 |
| 469 | 0.951856 | −0.306547 | 1.258402 | −0.645309 |
| 470 | 0.963069 | −0.269253 | 1.232323 | −0.693816 |
| 471 | 0.972823 | −0.231551 | 1.204374 | −0.741271 |
| 472 | 0.981101 | −0.193499 | 1.174599 | −0.787602 |
| 473 | 0.987391 | −0.155152 | 1.143043 | −0.832738 |
| 474 | 0.991585 | −0.129454 | 1.121039 | −0.862132 |
| 475 | 0.994612 | −0.103668 | 1.09828 | −0.890944 |
| 476 | 0.996968 | −0.07781 | 1.07478 | −0.919156 |
| 477 | 0.998652 | −0.0519 | 1.050556 | −0.946748 |
| 478 | 0.999242 | −0.03894 | 1.038177 | −0.960306 |
| 479 | 0.999663 | −0.02596 | 1.025624 | −0.973702 |
| 480 | 0.999916 | −0.01298 | 1.012897 | −0.986934 |
| 481 | 1 | 0 | 1 | −1 |
| 482 | 1 | 0 | 1 | −1 |
| 483 | 1 | 0 | 1 | −1 |
| 484 | 1 | 0 | 1 | −1 |

What is claimed is:

1. A multi-dimensional spread spectrum modulator comprising:
 a spreading sequence generator for generating a set of substantially mutually orthogonal spreading sequences;
 a first frequency spreading means comprising a first input for a first set of parallel input data streams; a second input for the set of spreading sequences, respective input data streams being associated with respective spreading sequences in the set of spreading sequences; and an output;
 a second frequency spreading means comprising a first input for a second set of parallel input data streams; a second input for the set of spreading sequences, respective input data streams being associated with respective spreading sequences in the set of spreading sequences; and an output; and
 a quadrature modulator comprising first and second inputs and an output, the first input of the quadrature modulator being connected to the output of the first frequency spreading means and the second input of the quadrature modulator being connected to the output of the second frequency spreading means,
 wherein the set of spreading sequences are derived from at least one complex sequence comprising a real part and an imaginary part, wherein each spreading sequence in the set of spreading sequences comprises a combination of at least two parts of the at least one complex sequence, wherein the combination is an arithmetic sum of the real part and the imaginary part, and wherein a first spreading sequence in the set comprises the sum of the real part and a negative of the imaginary part of the complex sequence and wherein a second spreading sequence in the set comprises a negative sum of said real part and said imaginary part of the complex sequence.

2. A multi-dimensional spread spectrum modulator comprising:
 a spreading sequence generator for generating a set of substantially mutually orthogonal spreading sequences;
 a first frequency spreading means comprising a first input for a first set of parallel input data streams; a second input for the set of spreading sequences, respective input data streams being associated with respective spreading sequences in the set of spreading sequences; and an output;
 a second frequency spreading means comprising a first input for a second set of parallel input data streams; a second input for the set of spreading sequences, respective input data streams being associated with respective spreading sequences in the set of spreading sequences; and an output; and
 a quadrature modulator comprising first and second inputs and an output, the first input of the quadrature modulator being connected to the output of the first frequency spreading means and the second input of the quadrature modulator being connected to the output of the second frequency spreading means,
 wherein the first input of the first frequency spreading means comprises n/2 branches for n/2 input data streams, wherein the first spreading means comprises n/2 spreading multipliers and the set of spreading sequences comprises n/2 spreading sequences connected to respective multipliers, to spread the n/2 data streams, wherein the first input of the second frequency spreading means comprises n/2 branches for n/2 input data streams, wherein the second spreading means comprises n/2 spreading multipliers and respective ones of the n/2 spreading sequences are connected to the n/2 multipliers of the second frequency spreading means to spread the n/2 data streams at the first input of the second frequency spreading means, wherein output signals of the n/2 multipliers of the first frequency spreading means are added by a first adder to provide a first spreaded signal; and wherein output signals of the n/2 multipliers of the second frequency spreading means are added by a second adder to provide a second spreaded signal.

3. A modulator as claim in claim 2, wherein the first and second spreaded signals are modulated on first and second quadrature carriers respectively, to provide first and second modulated spreaded signals.

4. A modulator as claim in claim 3, wherein the first and second modulated spreaded signals are added by a third adder to provide an output signal of the modulator.

5. A modulator as claimed in claim 4 wherein the first set of data streams is duplicated as the second set of data streams, wherein the spreading sequences are analytical and wherein the output signal is a single side-band signal.

6. An n-dimensional spread spectrum demodulator wherein n is larger than two, the demodulator comprising:
an input for a received modulated spread spectrum signal comprising n mutually orthogonal data signals spreaded with a set of n/2 substantially mutually orthogonal spreading sequences, wherein the set is derived from at least one non-binary complex sequence comprising a real part and an imaginary part utilizing combinations of the real part and the imaginary part;
the input being connected to a circuit for recovering quadrature carriers in the received signal;
a local despreading sequence generator for generating a set of n/2 mutually orthogonal despreading sequences, wherein the set is derived from at least one non-binary complex sequence comprising a real part and an imaginary part utilizing combinations of the real part and the imaginary part;
the input also being connected to a tracking and synchronizing circuit for tracking the n/2 spreading sequences in the received signal and synchronizing the locally generated despreading sequences with the tracked spreading sequences; and
circuitry connected to the carrier recovery circuit and the spreading sequence synchronization circuit for extracting the n data signals from the received signal, utilizing the recovered quadrature carriers and the n/2 despreading sequences.

7. A demodulator as claimed in claim 6 wherein the despreading sequences comprises combinations of the real and the imaginary parts of the at least one complex sequences.

8. A demodulator as claimed in claim 6 wherein the carrier recovery circuit comprises an n-dimensional decision-directed complex Costas carrier recovery loop having a first input for the received spread spectrum signal, a second input for the n/2 despreading sequences, a first output for the n data signals and a second output for the recovered quadrature carriers.

9. A demodulator as claimed in claim 8 wherein the second output is taken from a voltage controlled oscillator in the loop and which oscillator is driven by a first error signal derived from n-dimensional decision-directed circuitry of the Costas carrier recovery loop.

10. A demodulator as claimed in claim 9 wherein the tracking and synchronizing circuit comprises an n-dimensional decision-directed complex delay-locked-loop having a first input for the received spread spectrum signal, a second input connected to the second output of the carrier recovery circuit for receiving the recovered carriers; a third input connected to the first output of the carrier recovery circuit for inputting the recovered data signals; a fourth input for data relating to late and early replicas of the despreading sequences; a first output for the synchronized despreading sequences which is connected to the second input of the carrier recovery circuit; and a second output for said data relating to late and early replicas of the despreading sequences and which second output is connected to sad fourth input.

11. A demodulator as claimed in claim 10 wherein the first and second outputs are taken from a voltage controlled code generator which is driven by a second error signal derived from n-dimensional decision-directed circuitry of the complex delay-locked-loop.

12. A modem comprising a modulator as claimed in claim 1 and a demodulator as claimed in claim 6.

13. A method of frequency spread modulating n data streams wherein n is larger than two, the method comprising the steps of:
dividing the n data streams into first and second groups of n/2 streams each;
utilizing n/2 substantially mutually orthogonal spreading sequences respectively to frequency spread the streams in the first group, thereby to provide a first group of n/2 mutually orthogonal frequency spreaded signals, wherein the n/2 spreading sequences are derived from at least one non-binary complex sequence comprising a real part and an imaginary part utilizing combinations of the real part and the imaginary part;
utilizing the n/2 spreading sequences respectively to frequency spread the streams in the second group, thereby to provide a second group of n/2 mutually orthogonal frequency spreaded signals; and
modulating the first group of frequency spreaded signals and the second group of frequency spreaded signals on first and second quadrature carriers respectively, thereby to generate n mutually orthogonal modulated data signals.

14. A method of demodulating n substantially mutually orthogonal data streams in an incoming spread spectrum signal and wherein n is larger than two, the method comprising the steps of:
utilizing one of: (a) a set of n/2 substantially mutually orthogonal despreading sequences derived from at least one non-binary complex sequence comprising a real part and an imaginary part utilizing combinations of the real part and the imaginary part; and (b) first and second quadrature signals, to separate the n data streams into first and second substantially mutually orthogonal groups of signals; and
utilizing another of (a) and (b) to extract the n data streams from the first and second groups.

15. An n-dimensional spread spectrum modulator having n data inputs and wherein n is larger than two, comprising:
a spreading sequence generator for generating a set of n/2 substantially mutually orthogonal spreading sequences, wherein the set is derived from at least one non-binary complex sequence having a real part and an imaginary part utilizing combinations of the real part and the imaginary part;
a first frequency spreading arrangement comprising a first set of n/2 inputs for n/2 parallel input data streams, a second set of n/2 inputs one for each of said spreading sequences, each input of the first set being associated with a respective input of the second set and an output, so that each input data stream is associated with a respective spreading sequence to provide at the output of the first arrangement n/2 mutually orthogonal frequency spreaded data signals;
a second frequency spreading arrangement comprising a first set of n/2 parallel inputs for n/2 parallel input data streams, a second set of n/2 inputs one for each of said spreading sequences, each input of the first set being associated with a respective input of the second set and an output, so that each input data stream is associated with a respective spreading sequence to provide at the output of the second arrangement n/2 mutually orthogonal frequency spreaded data signals; and a quadrature modulator comprising first and second inputs and an output, the first input being connected to the output of the first frequency spreading arrangement and the second input being connected to the output of the second frequency spreading arrangement, to provide at the output of the quadrature modulator n mutually orthogonal spreaded and modulated data signals.

16. A modulator as claimed in claim 15 wherein the first spreading arrangement comprises n/2 spreading multipliers each comprising a first input connected to a respective input of said first set of inputs, a second input connected to a respective input of said second set of inputs and an output, wherein the output of each multiplier is connected to a respective input of a first adder having an output connected to the output of the first arrangement.

17. A modulator as claimed in claim 16 wherein the second spreading arrangement comprises n/2 spreading multipliers each comprising a first input connected to a respective input of said first set of inputs, a second input connected to a respective input of said second set of inputs and an output, wherein the output of each multiplier is connected to a respective input of a second adder having an output connected to the output of the second arrangement.

18. A modulator as claimed in claim 17 wherein the output of the first adder is connected to the first input of the quadrature modulator and the output of the second adder is connected to the second input of the quadrature modulator.

19. A modulator as claimed in claim 18 wherein the output of the quadrature modulator comprises first and second outputs for quadrature signals and wherein said first output is connected to a first input of a third adder and said second output is connected to a second input of the adder, an output of the adder being connected to an output of the n-dimensional modulator.

20. A modulator as claimed in claim 15 wherein n is equal to four, wherein the n/2 substantially mutually orthogonal spreading sequences comprises first and second spreading sequences which are derived from one complex sequence.

21. A modulator as claimed in claim 15 wherein n is larger than four and the n/2 spreading sequences are derived from not more than n/4 complex sequences.

22. A modulator as claimed in claim 21 wherein the n inputs of the modulator are divided in n/4 groups of four, wherein for each group two inputs form part of the first spreading arrangement and two inputs form part of the second spreading arrangement, and wherein first and second spreading sequences for each group are derived from a respective one of the n/4 complex sequences.

23. A modulator as claimed in claim 15 wherein each spreading sequence in the set of spreading sequences comprises a combination of at least two parts of the at least one complex sequence.

24. A modulator as claimed in claim 23 wherein the combination is an arithmetic sum of the real part and the imaginary part.

25. A modulator as claimed in claim 24 wherein a first spreading sequence in the set comprises the sum of the real part and a negative of the imaginary part of the at least one complex sequence and wherein a second spreading sequence in the set comprises a negative sum of said real part and said imaginary part of the at least one complex sequence.

26. A modulator as claimed in claim 15 wherein the first set of n/2 inputs of the first frequency spreading arrangement and the first set of n/2 inputs of the second frequency spading arrangement are connected to an output of a serial-to-parallel converter.

27. A modulator as claimed in claim 15 wherein the input data streams of the first spreading arrangement are also used as the input data streams for the second spreading arrangement, wherein the spreading sequences are analytical and wherein the output signal is a single side-band signal.

28. A multi-dimensional spread spectrum modulator comprising:

a spreading sequence generator for generating a set of substantially mutually orthogonal spreading sequences, the set of spreading sequences being derived from at least one complex sequence comprising a real part and an imaginary part, wherein a first spreading sequence in the set comprises a sum of the real part and a negative of the imaginary part of the at least one complex sequence and wherein a second spreading sequence in the set comprises a negative sum of said real part and said imaginary part;

a first frequency spreading means comprising a first input for a first set of parallel input data streams; a second input for the set of spreading sequences, respective input data streams being associated with respective spreading sequences in the set of spreading sequences; and an output;

a second frequency spreading means comprising a first input for a second set of parallel input data streams; a second input for the set of spreading sequences, respective input data streams being associated with respective spreading sequences in the set of spreading sequences; and an output; and a quadrature modulator comprising first and second inputs and an output, the first input of the quadrature modulator being connected to the output of the first frequency spreading means and the second input of the quadrature modulator being connected to the output of the second frequency spreading means.

\* \* \* \* \*